United States Patent
Maichel

(10) Patent No.: US 11,959,577 B2
(45) Date of Patent: Apr. 16, 2024

(54) INSERT VALVE AND METHOD OF INSERTION INTO PRESSURIZED PIPELINES

(71) Applicant: Jeffrey Maichel, Murrieta, CA (US)

(72) Inventor: Jeffrey Maichel, Murrieta, CA (US)

(*) Notice: Subject to any disclaimer, the term of this patent is extended or adjusted under 35 U.S.C. 154(b) by 174 days.

(21) Appl. No.: 17/790,681

(22) PCT Filed: Feb. 16, 2021

(86) PCT No.: PCT/US2021/018267
§ 371 (c)(1),
(2) Date: Jul. 1, 2022

(87) PCT Pub. No.: WO2021/163710
PCT Pub. Date: Aug. 19, 2021

(65) Prior Publication Data
US 2023/0041200 A1 Feb. 9, 2023

Related U.S. Application Data

(60) Provisional application No. 62/977,100, filed on Feb. 14, 2020.

(51) Int. Cl.
*F16K 1/22* (2006.01)
*F16K 43/00* (2006.01)
*F16L 55/18* (2006.01)

(52) U.S. Cl.
CPC .............. *F16L 55/18* (2013.01); *F16K 1/22* (2013.01); *F16K 43/00* (2013.01)

(58) Field of Classification Search
CPC ............. F16L 55/18; F16K 1/22; F16K 43/00
See application file for complete search history.

(56) References Cited

U.S. PATENT DOCUMENTS

| 2002/0017092 | A1 | 2/2002 | Josset et al. |
| 2012/0055572 | A1* | 3/2012 | Noll ...................... F16K 43/001 |
| | | | 29/890.121 |
| 2020/0032923 | A1* | 1/2020 | Sun .......................... F16K 43/00 |

FOREIGN PATENT DOCUMENTS

| JP | 3-272389 | 12/1991 |
| JP | 2004-19854 | 1/2004 |

OTHER PUBLICATIONS

International Search Report and International Written Opinion issued in corresponding International Patent Application No. PCT/US2021/018267, dated May 18, 2021.

* cited by examiner

*Primary Examiner* — Kevin R Barss
(74) *Attorney, Agent, or Firm* — LOZA & LOZA, LLP; Michael Fedrick

(57) ABSTRACT

A method of cutting and removing a section of prestressed concrete cylinder pipe and then installing a replacement valve while the pipeline is fully pressurized uses a replacement valve body (22) with two cylinders (223, 225) that match the openings of the cut pipe (35). Inside each of the two cylinders (223, 225) is a cut-covering assembly (62) which includes a cylindrical elastomeric seal (26) and spring tube (25), and a cross brace (27) extends between two surfaces within the spring tube (25). The replacement valve body (22) further includes a rotatable valve (24) in a central portion of the valve, and when the cylinder ends of the replacement valve body (22) are positioned adjacent the bores of cut pipe ends (36), the valve (24) can be rotated to push the elastomeric seals (26) of each of the cut-covering assemblies (62) into the bores of the cut pipe ends (36), thereby covering gaps (77) created when the pipe (35) was cut and placing the pipe ends (36) in fluid-tight engagement with the replacement valve body (22).

10 Claims, 25 Drawing Sheets

INSERT VALVE AND METHOD OF INSERTION INTO PRESSURIZED PIPELINES

CROSS-REFERENCE TO RELATED APPLICATIONS

This application is the U.S. national stage of International Patent Application No. PCT/US2021/018267, filed on Feb. 16, 2021 and entitled INSERT VALVE AND METHOD OF INSERTION INTO PRESSURIZED PIPELINES, which claims the benefit of priority under 35 U.S.C. § 119(e) from U.S. Patent Application No. 62/977,100, filed Feb. 14, 2020. The disclosures of the foregoing applications are incorporated herein by reference in their entirety.

BACKGROUND

In the past pipe ends were joined by complex bells and spigots, much larger than the pipe's diameter to allow joining, and these configurations would have to slide together mechanically within a pressurized enclosure. On prestressed concrete cylinder pipe (PCCP) where only short work areas can be allowed so the thin cylinder can stay restrained. With known external pipeline sealing methods, long areas of the cylinder would have to be stripped of wire, running the risk of a blowout or a cylinder rupture.

SUMMARY

The present method solves these issues by requiring the temporary enclosure to be installed in only short areas, and once the enclosure is removed outside couplings can be installed in the same location as where the enclosure seals were placed.

The present method uses the natural movement of a butterfly isolator to push or move internal seals from a replacement valve into the bores of existing pipe ends. The action of moving the butterfly's isolator moves two temporary seals into position to cover entire gaps created by cutting a pipe to insert a valve. These seals temporarily cover cuts made in the pipe in fluid-tight arrangement between the new valve ends and the existing pipe ends until permanent external seals can be installed. This process can be used on most known pipe types.

The size, weight and many difficulties that make valve insertions into pipes complex are reduced by this method that sets a temporary seal inside the pipe sections to allow much smaller permanent fittings to be installed after the enclosure is removed in an open, unpressurized environment. There may be applications where bells and spigots would have to be used and other connections could be imagined. The use of these alternative connections would not take away from the spirit of how the restraining method for PCCP pipe is performed.

In addition, I have included a method of restraining pre-stressed tension wire of known PCCP pipe, and a new way to cut and remove the pipe section and then install a new valve and join the new valve with the exposed pipe ends while the pipeline is fully pressurized.

PCCP pipe is manufactured using a thin steel cylinder to provide a fluid-tight membrane and employs a wire wound at high tension around this cylinder that in combination contains the internal pressures used in pipeline systems.

This method provides the installation of new valves into most types of pipelines as well as PCCP pipe. Steel, PVC, ductile iron, copper, stainless, transite A/C and cast iron pipe can all utilize this method to insert a new valve but these other types of pipes are manufactured from a single material so these will not require the restraining methods as described in detail to allow the safe stripping of concrete or wire in order to expose a work area of the smooth pipe cylinder. For PCCP the center clamp is used on all pipe types to retain the center section for cutting and to enable lifting out the cut section into the bonnet as shown, but permanent restrainers will not need to be left in place on pipe that is not PCCP. The process for PCCP pipe and single wall pipe types can be performed in the same way other than with respect to restraining the concrete and wire on PCCP pipe to expose work areas of the smooth cylinder. A smooth cylinder surface exists on other pipe types without the restraining process.

PCCP pipe has been installed for many years and as the old control valves wear out, new isolation valves are needed, and if a change or repair is required on a system new valves are required to be isolated. The thin steel cylinder used in PCCP cannot contain the working pressures of the pipeline without the supporting tension wire remaining in place. A process and system for removing the wire to insert a valve has not been revealed until now.

The tension wire is covered and embedded in the concrete coating to hold the wire in place and protect the wire from damage and corrosion. Wire is wound at high tension around the steel cylinder to increase the pressure rating. On PCCP pipe if the tension wire is cut or damaged it will unwind from the cylinder, causing the pipe to lose its strength. The present invention allows the wire to be restrained and cut without concern that the wire will unwind from the cylinder. This system also provides the capability for at least one of the restraints to be removed with a pipe section and that center restraint replaced with a valve while the pipeline is fully pressurized without risk of the wire unwinding from the steel cylinder.

PCCP pipe is composed of a round carbon steel cylinder with wire wound around it and provides concrete lining and concrete coating. This configuration of different materials makes installing known types of insertion systems not possible for PCCP pipe. Bolting an insert body to the PCCP concrete coating would not result in a fluid-tight seal, and if you removed the concrete to expose the wires there would not be a smooth surface to permanently seal as the surface is uneven due to the wire being wrapped around this cylinder. In addition, removing the tension wire from the PCCP cylinder in a long area for a valve body to be installed is not possible without risking the integrity of the pipe.

The present method was developed to restrain PCCP tension wire along various locations of the pipe and expose short smooth work areas of the PCCP pipe cylinder where permanent and temporary fittings can be installed and removed. The method involves restraining a section of pipe by use of a center restraining clamp to support the area, removing a section of pipe, and making an area for to insert a valve with pipe ends inserted and seals that can be simply inserted internally so the less wire can be removed from the host pipes structure.

On PCCP pipe this process provides for at least two outside restraining clamps that are mechanically installed onto the pipe coating to permanently retain the coating's internal tension wires. In addition, at least one temporary center restraining clamp that surrounds the concrete coating is used to retain the wire, and once the pipe is cut this center clamp(s) becomes sacrificial and removed with the cut section of pipe. This installation of clamps provides at least two locations where a smooth steel cylinder can be safely exposed to mount a temporary enclosure. Being able to remove the center clamp under pressure with the severed pipe provides a method that supports the pipe when needed, and is removed with the clamp under pressure making room for a new valve once the restraint of the pipe is no longer needed.

By providing at least three restraining clamps that encircle the concrete coating as shown in this method, the tension wire is held in place so valve Inserting can be performed on fully a pressurized PCCP pipeline.

This process provides various restraining mechanism(s) or "clamp(s)" to hold wires in place by securing the concrete that holds the embedded wire. The term "clamp" will be understood to refer to one clamp or to multiple clamps used in combination that are meant to encircle a pipeline's concrete coating holding it in tension, to retain the wire in place. The clamps can be tightened around the concrete coating, enabling the clamps to tightly hold the concrete and embedded wire in position.

To begin the restraining process, at least three clamps are used to prepare the pipe for inserting a valve. The center restraining clamp is almost as wide as the intended cut section of pipe and this center clamp's main function is to support and retain a section of pipe by holding the wire within the pipe coating until the pipe section is cut and the center-clamp is removed with the pipe section under pressure and discarded. In addition to the center clamp there is at least one outside clamp installed on each side of the center clamp to permanently retain the concrete and wire that support the pipe from internal pressure.

On PCCP pipe, space is provided between the center clamp and each outside clamp to allow the removal of concrete and wire to expose the smooth steel cylinder on each side of the center clamp. This area of exposed smooth PCCP cylinder allows the installation of a pressure holding container or "enclosure" that can be installed onto the cylinder in a short area.

The exposed smooth areas need to be kept as short as possible. On some applications it may be necessary to obtain additional short clear working areas by using additional clamps to remove more than two areas of concrete and wire to expose more smooth work areas. If required, at least a second set of outside clamps can be installed a short distance away on the outside of the initial outside clamps to retain the concrete and wires.

This second set of clamps would be a short distance away and additional clamps can be installed outside of the initial outside clamps to gain additional work areas. This process can provide additional access locations of the smooth cylinder so enclosure glands and work locations can be installed in separate areas along the cylinder.

The enclosure attached to the pipe cylinder has a means of accepting a service valve to be mounted on top and act as a fluid isolator for a bonnet so tooling can be installed and removed to complete the new insert valve installation while the pipeline remains pressurized. Bonnets for use with the present system and method are known to the art, and are described for example in U.S. Pat. Nos. 6,983,759, 6,776,184, 7,021,325, and 7,021,325. A temporary pressure-tight enclosure is installed onto the host pipe in fluid-tight arrangement and seals on the pipe wall and on PCCP seals in the short areas of smooth cylinder provided. The pressure-tight enclosure is split into at least two halves so each end of the container can be assembled onto the existing pipeline by use of split mechanical draw glands that force a split tapered wedge-style rubber gasket into a receiving area for the wedged rubber on the enclosure to make the fluid-tight seal.

The pressure-tight enclosure is built to encompass the center clamp and the intended pipe that will be removed. The enclosure provides a support for a service valve that allows various functions to complete the valve insertion.

In addition, the bonnet of the present system is designed to be large enough to house a stabilizing member and cutting mechanism and provides enough room to receive the cut section of pipe and center clamp with the cutting mechanism and the stabilizing member all at one time if desired. Initially, the bonnet housing with the stabilizing member and the cutting mechanism is held above the service valve. The stabilizing member is extended to reach the center clamp and both are secured together in rigid fashion by bolting or threading. Once the stabilizing member is secured with the center clamp, the bonnet housing can be lowered with the cutting mechanism using the stabilizing mechanism and secured to the open service valve in fluid-tight arrangement. Once secured to the open service valve the cutting mechanism can be lowered into position by known advancing mechanisms such as a screw jack and a packing seal to keep fluid from passing from the bonnet. With the stabilizing member attached to the center clamp the intended pipe to be cut is held in rigid position. The enclosure has pipe supports that can be advanced or tightened against the exposed cylinder or center clamp that will help hold the pipe section to be cut in a rigid manner. The cutting mechanism will begin cutting the crown of the pipe and pass through the entire pipe section.

The cutting mechanism uses a flexible cutting belt that can include cables, wires or have flexible chains similar to a chain saw. Diamonds or known hard particles are attached to perform cutting or abrasive separation of the pipe. The cutting mechanism can cut two paths simultaneously but on some applications only one cut may be performed at a time. The flexible cutting tool provides at least one drive wheel for each flexible belt and one or more wheels to keep the flexible belt tight and movable. The motor to drive the flexible belts can incorporate a direct drive that uses at least one rod or driveline that can pass through the bonnet to one or more gearboxes. This rotational movement will drive the wheels to power the belts so a motor can be provided outside of the pressurized container.

As the cutting penetrates the pipe wall the enclosure becomes fully pressurized by the pipes contents as the fluid enters the enclosure. The enclosure provides a housing that contains the fluid pressure, so equal pressure will exist on the outside of the pipe as well as the inside of the pipe, this allows the center clamp to become sacrificial as the pipe section requires no more restraint of the tension wire at this center location once equal pressure is achieved.

Once the pipe section is completely separated, the stabilizing member is operated to retract and remove the cut section of pipe that is attached to the center restraining clamp. The cutting mechanism can be fully retracted into the bonnet housing with the stabilizing member so the service valve can be closed. Closing the service valve allows the depressurization of the bonnet and removal of the bonnet from the service valve with all the enclosed items. The cut section of pipe attached to the center restraining clamp is removed from the stabilizing member and the cutting mechanism is removed from the bonnet housing.

A new valve to be inserted into the pressurized system is positioned and securely attached to the stabilizing member and moved into the housing of the bonnet. The insertion valve is set in the closed or semi closed position prior to inserting into the pipeline. Cut-covering assemblies are installed fully into both pipe ends one on each side of the new valve. The bonnet is reinstalled onto the service valve in fluid-tight arrangement and the bonnet becomes pressurized by opening the service valve to allow fluid to pass into the bonnet. Once the service valve is fully opened the stabilizing member securing the new valve with pipe ends holding cut-covering assemblies is extended into the fully installed and secure position within the gap left by the removed pipe section.

The cut-covering seals are wider than the gap made in the pipe by the cutting tool. The cut-covering seal may incorporate designs that help seal the gap created by the pipe being cut. The seal design could include angles, pockets, or any number of imaginable different designs to make up a seal that holds the seal in its desired position, and that covers and plugs the cut or gap in a fluid-tight and structurally sound arrangement.

A spring producing cylinder creates outward pressure on the seal to keep the seal riding on the inside diameter of the pipe walls, keeps the fluid pressure from extruding the seal through the cut and holds the new valve in position once the service enclosure is removed. Many types of supports can be used, but preferably steel or stainless steel rolled under tension is used to create a round shape that matches the diameter needed and provides an outward pushing force. The round shape can provide an overlap that gives the desired expansion needed to add spring to the cylinder.

Together this cut-covering assembly provides a spring-loaded sealing member that supports the valve installation once moved into position with the existing pipe ends. The cut-covering assembly is hollow in shape and looks similar to a piston-inserting tool that is used to compress piston rings prior to sliding the piston into an engine bore.

The cut-covering assembly initially is installed into both pipe ends of the new valve. When moved partially into the existing pipe ends the cut-covering assembly will cover the entire cut made around the internal diameter of the pipe. The cut-covering assembly will end up preferably half in the new valve ends and half in the existing pipe to cover the gap in order to make a fluid-tight seal.

A cross brace is provided on one side of the cut-covering assembly closest to the butterfly valve so the butterfly's isolator can contact the cut-covering assembly when the butterfly valve operator is rotated in the open direction. Operating the butterfly valve is performed by providing a round rod through the bonnet attached to the service valve on the enclosure. A packing seal is provided on the bonnet around the operational rod to keep fluid from passing out of the bonnet. By rotating the new valve's operator in the opening direction the isolator pushes the cut-covering assembly and slides into the existing pipe to a predetermined location within the existing pipe ends.

With the new valve ends inline with the existing pipe ends, the butterfly valve is opened to allow the isolator to engage the cross brace. Upon continuing opening, the isolator slides across the cross braces as it pushes the cut-covering assembly from its position within the new valve ends, preferably halfway into the existing pipe. This action allows the cut-covering assembly to slide through the bore of both pipe ends into the existing pipe to a planned location. Both cut-covering assemblies are pushed and slide in the same manner in opposite directions from the new valve end locations, the cut-covering assemblies enter into the existing pipes cut ends and continue traveling until the valves isolator reaches its fully open position. A portion of the cut-covering assembly stays within the new valve's pipe ends and a portion moves into the existing pipe where the cut or gap is covered in fluid-tight arrangement. The outward springing action of the tube provides even continual outward pressure of the sealing portion of the cut-covering assembly to keep it pressed against the inside diameter of the new valve ends and the existing pipe wall, thus securing it in position while traveling to installing a seal into position over the gap caused by the cut.

Once the new valve is in position with the existing pipe and the internal cut-covering assembly is in place the enclosure housing used in the insertion process can be depressurized. Once depressurization is performed it will cause the internal pressure of the existing pipeline to press the cut-covering seals tight against the inner walls, securing the seals into position. The rigid spring tube will keep the seal from extruding through the cut gap and restrain the new valve in position.

To finish the valve installation process the temporary pressurized enclosure is removed. Conventional pipe-joining couplings can be placed around the exterior of the pipe to securely cover both cuts as a permanent completion to the valve installation.

The cutting mechanism is shown to be advancing toward the pipeline and retracted by means of a feed screw that can be operated by rotating two screw jacks, though a single jackscrew can be used. The cutting tool uses power drive heads that is shown to rotate two belts that have diamonds, cutting or abrasive medium attached. Two belts are shown to perform two simultaneous cuts at the same time to separate a pipe section. On various projects it may be required to make a single cut at a time but two are shown for simplicity. The cutting mechanism feed screw can also be used to operate the new valves isolator to the open or closed position.

Figure 7:
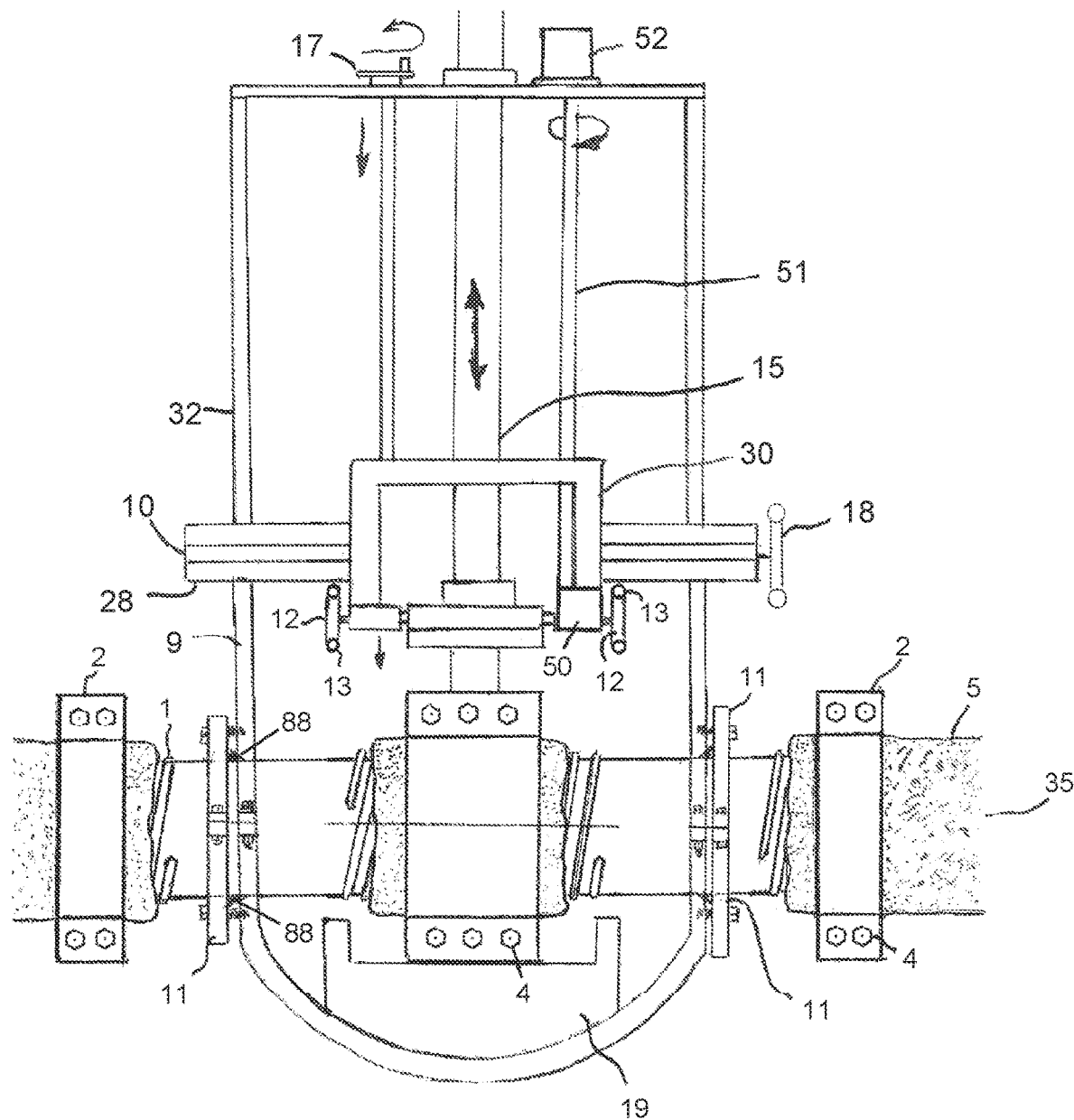
FIG. 7 is a sectional side elevation view that shows a bonnet attached to a service valve. The service valve is in the fully open position, allowing the stabilizing member to advance and retract when the service valve is in the open position. The bonnet shown is retaining the center clamp in position. There are brackets as part of the enclosure that support the proposed section of pipe to be cut, keeping it rigid between these brackets and the stabilizing member.
Figure 8:
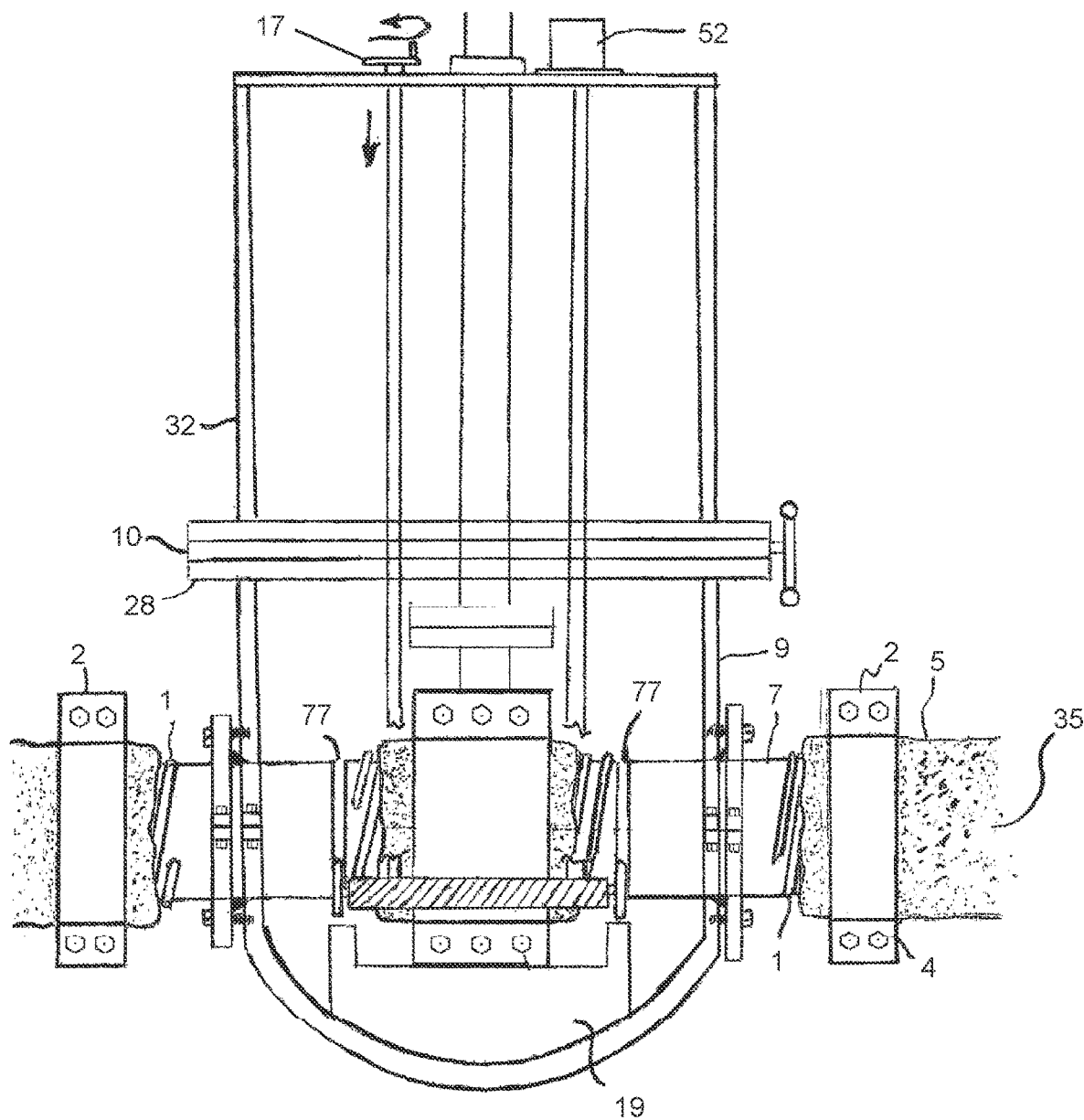

FIG. 8 is a sectional side elevation view of the configuration of FIG. 7 but showing the cutting tool having passed completely through the pipe, severing the intended pipe section and revealing the gap left by the cut. This creates two pipe ends of the existing pipe. The illustration also shows the enclosures brackets that have retained the cut section of pipe during the cutting process and the same brackets will position the new valve into a precise position when installed.

Figure 9:
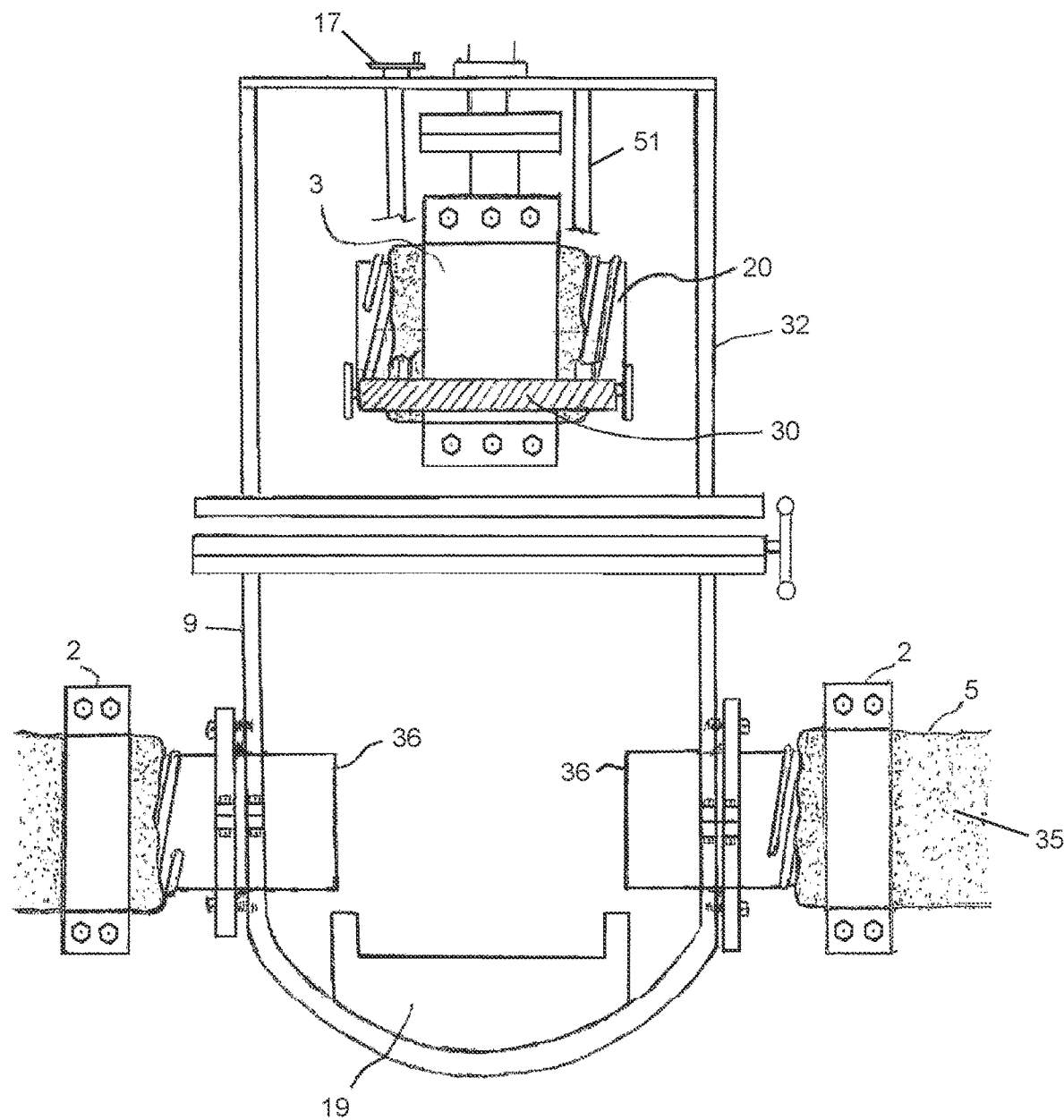

FIG. 9 is a sectional side elevation view of the configuration of FIG. 7 that shows the bonnet and service valve of FIGS. 7 and 8 after severing the pipe. The center restraining clamp and pipe section are both removed together into the housing by retraction of the stabilizing member. This process provides an area where the new valve will be installed.

In addition to the removal of the cut pipe and clamp, the cutting tool is removed from the enclosure into the bonnet and the service valve is closed. The bonnet as shown has been depressurized and removed from the enclosure.

Figure 10:
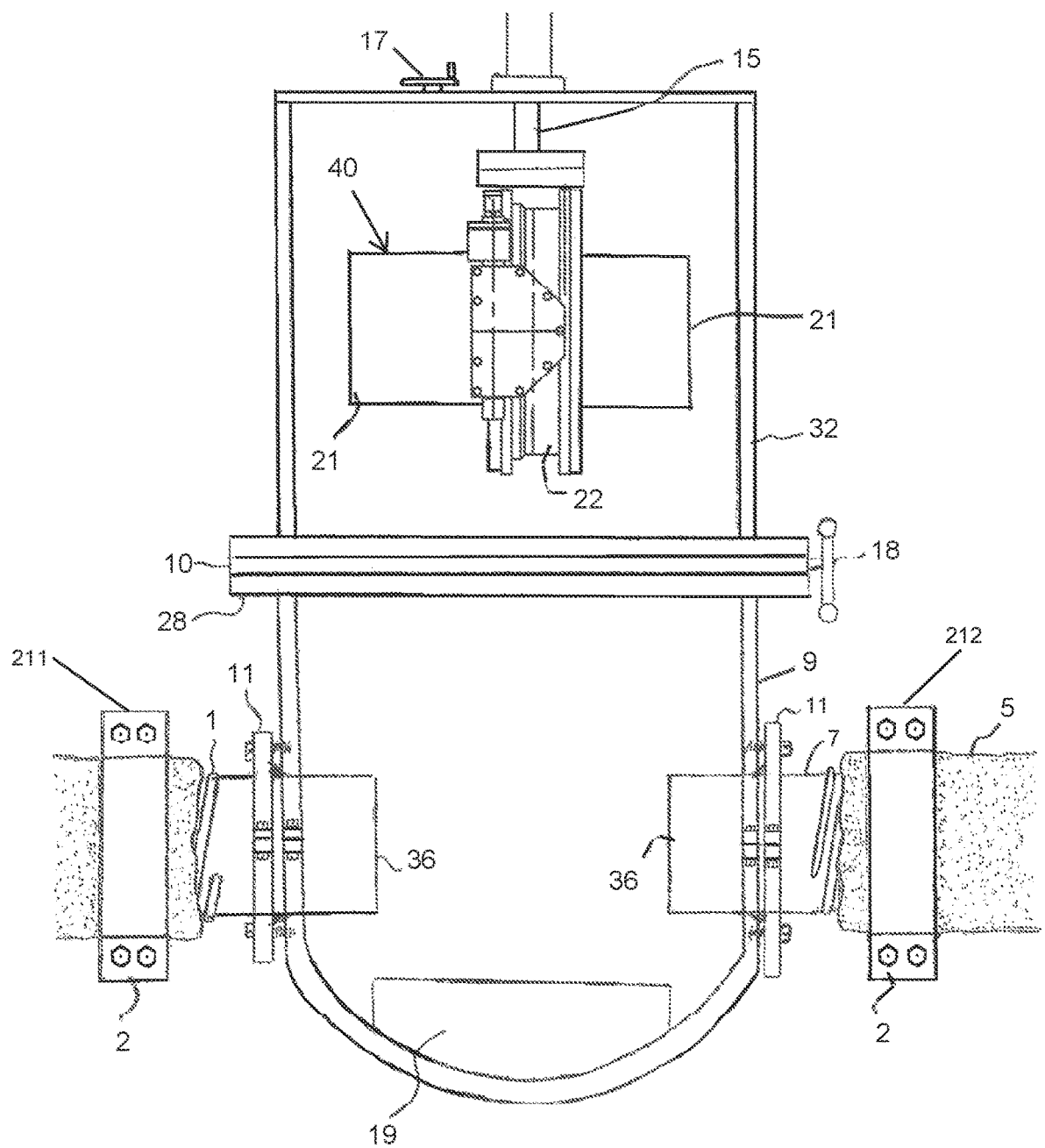

FIG. 10 is a sectional side elevation view of the configuration of FIG. 7 that shows the new valve with its attached pipe ends, each holding a cut-covering assembly and attached to the stabilizing member. The new valve is retracted into the housing of the bonnet by retraction of the stabilizing member. The bonnet is reattached onto the service valve so it can be fully opened to allow passing of the new valve into the position or existing gap left behind by the removal of the cut section of pipe.

Figure 11:
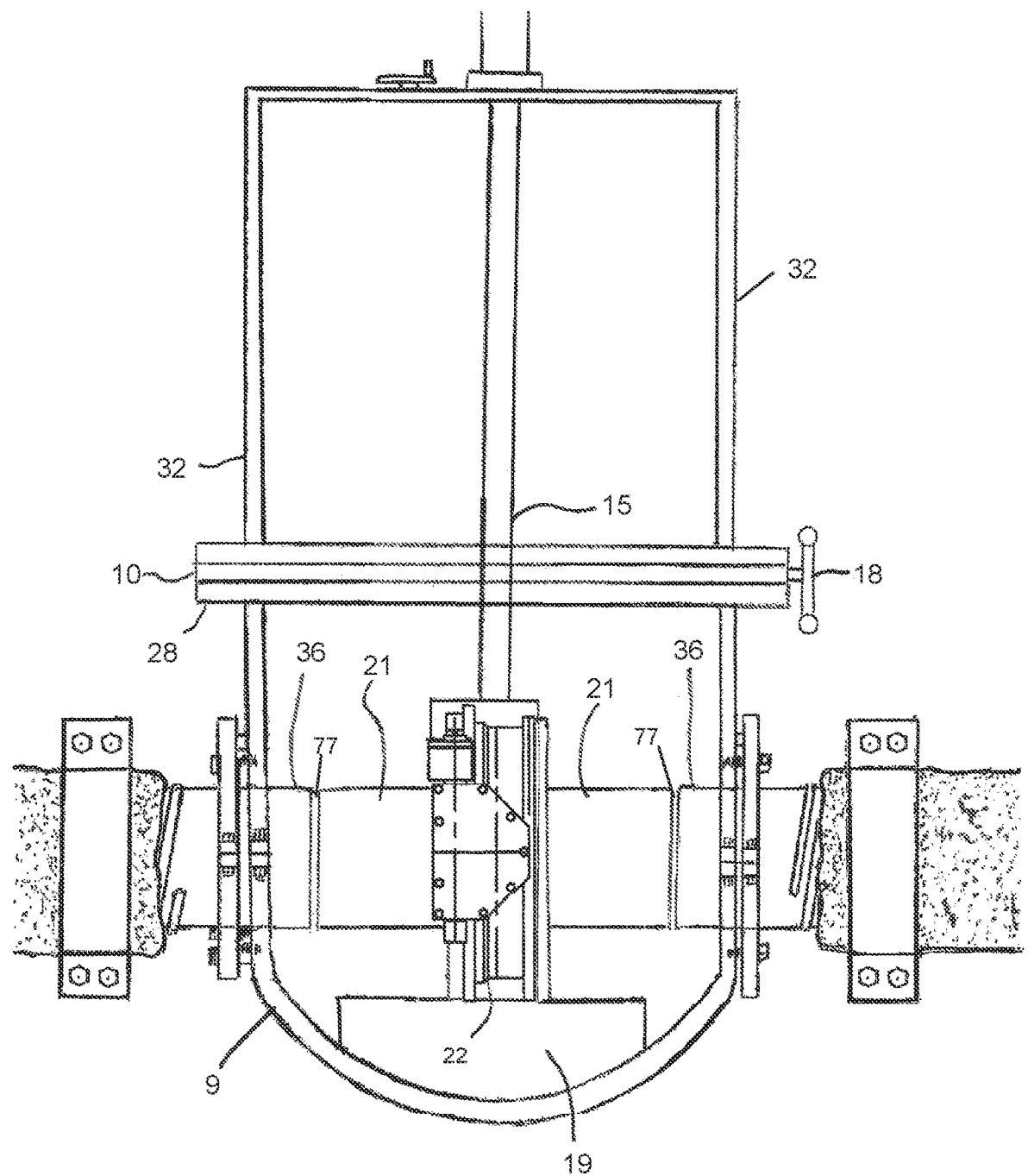

FIG. 11 is a sectional side elevation view of the configuration of FIG. 7 that shows the stabilizing member advanced and placing the new valve into a rigid position with the enclosure centering brackets. This rigid installation of the valve provides the valve's pipe ends to be inline with the existing pipes cut ends. The new valve is stabilized into a position to allow precise alignment of the new and existing pipe bores. This illustration shows the gap 77 between the existing pipe ends and the new valves pipe ends.

Figure 12:
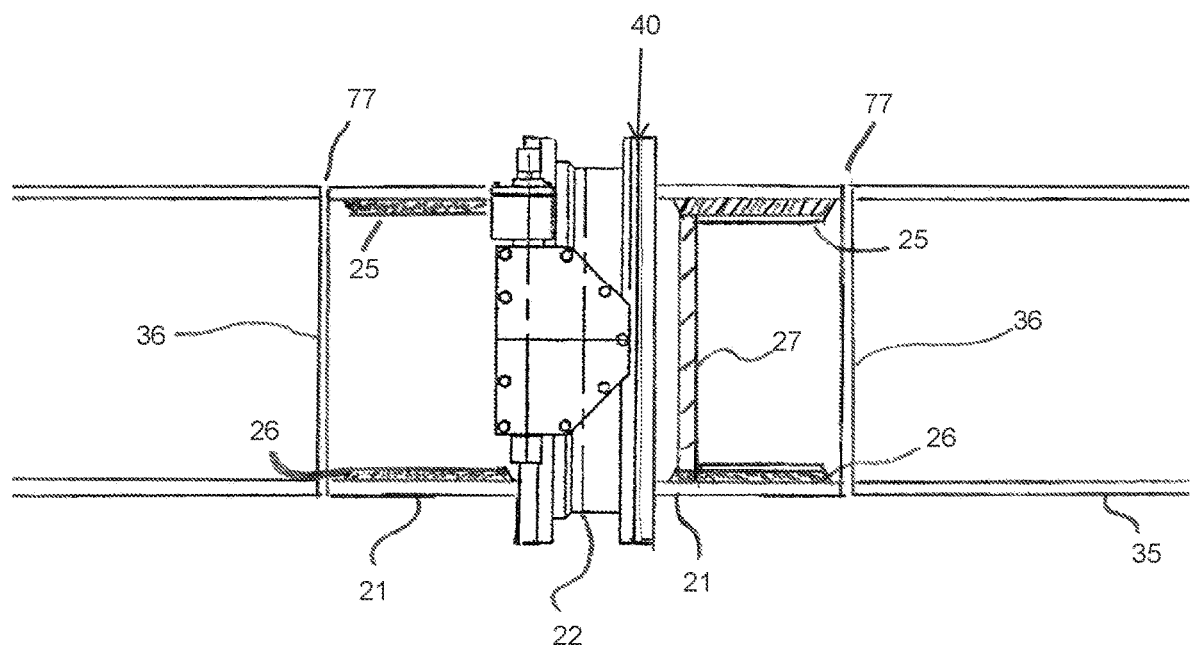

FIG. 12 is a side elevation view that shows the new valve ends installed in direct alignment with the existing pipe ends. The cut-covering assemblies provide spring-loaded sealing members (25, 26) housed within the new valve ends, which are wide enough to remain in a portion of the new valve ends, cover the cut gap in the pipe, and enter into the existing pipe ends.

Figure 13:
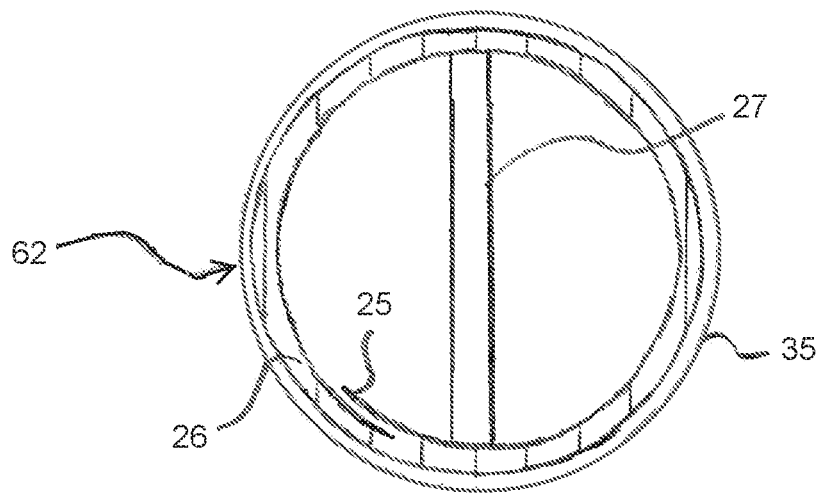

FIG. 13 is a sectional view of the cut-covering assembly. The outside circle is a pipe wall, the hashed-marked area is the rubber or flexible compound seal, and the overlapping internal line is the spring-type cylinder that is rolled to provide exterior expansion and can be pulled together prior to being inserted into the new valve ends so it will naturally want to expand, creating a force on the sealing member to keep it along the pipe's interior in the new valve's pipe ends or the inside diameter of the existing pipeline.

Figure 14:
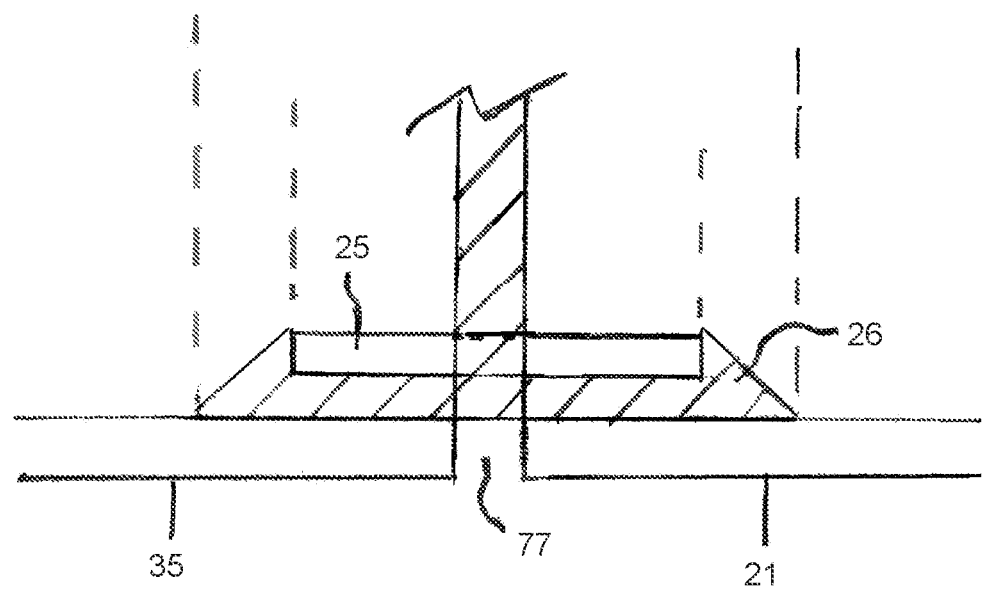

FIG. 14 is a sectional view showing an embodiment of the sealing portion of the cut-covering assembly and how the rubber could be held into position in relationship with the spring tube. The cut-covering assembly seal is covering the gap cut in the pipe, a portion of the existing pipe interior and a portion of new valve pipe interior. The gap is shown above the seal design and is covered continually around the whole diameter of the pipe to create a fluid-tight seal of the gap.

Figure 15:
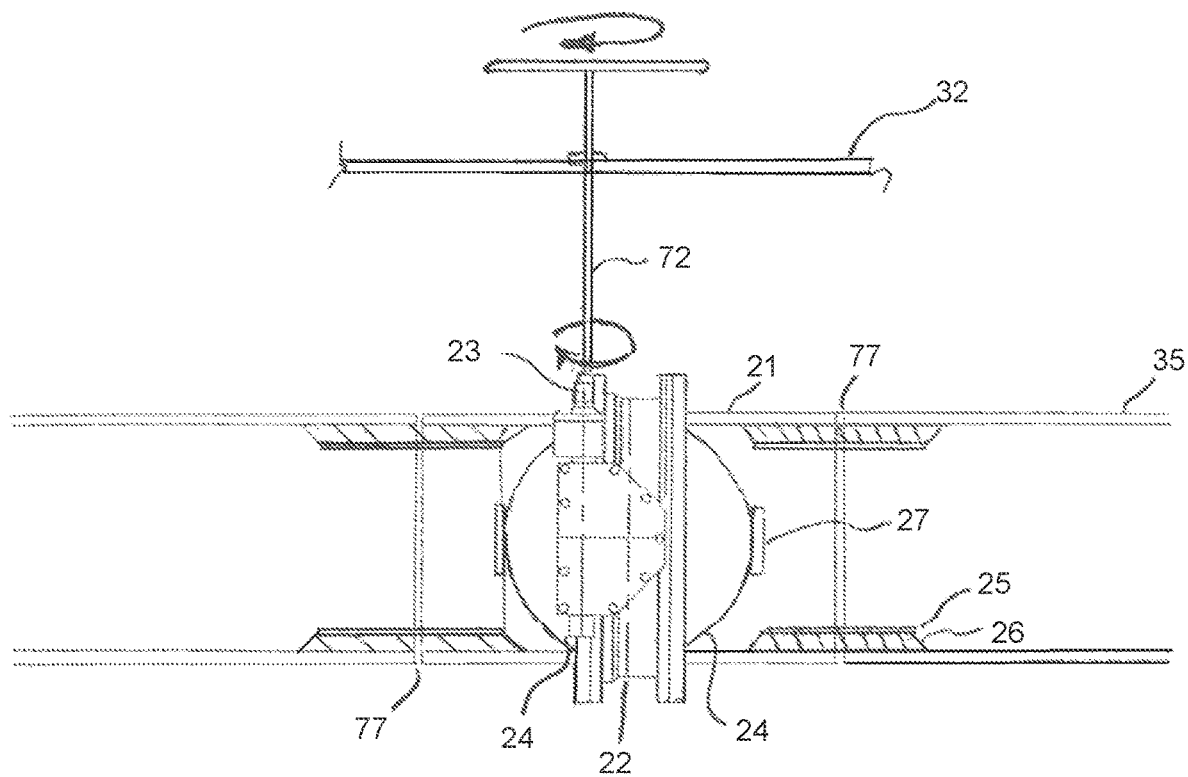

FIG. 15 is a side sectional view that depicts the new valve ends being installed in direct alignment with the existing pipe ends. The new valve can be opened under pressure by using a rod that passes through the bonnet and is connected to the operating nut of the butterfly valve. A seal is provided on the bonnet to keep fluid from escaping.

By turning the operating mechanism in the direction that opens the new valve, both cut-covering assemblies (one on each side of the new valve) are evenly pushed by direct engagement of the butterfly isolator.

The natural movement when opened keeps the cut-covering assemblies evenly moved to a predetermined location. The isolator of a butterfly valve when opened uses a pivoting movement to rotate a disc, and as the disc rotates it increases in length into the new valves pipe ends making it contact the cut-covering assemblies. A cross brace structure is provided on the cut-covering structure so the whole assembly can be moved by the isolator engagement and the isolator can freely slide from one end of the cross brace to the center as the rotating movement progresses.

This engagement moves both sides of the cut-covering assemblies away from the new valve at the same time and rate into the shown position where the seal can reside in the new valve's pipes, cover the gap, and reside in the existing pipe. This procedure allows both seals to be gently placed into position, ready for depressurization of the enclosure that will seal both cut-covering assemblies to the pipe's interior.

Figure 16:
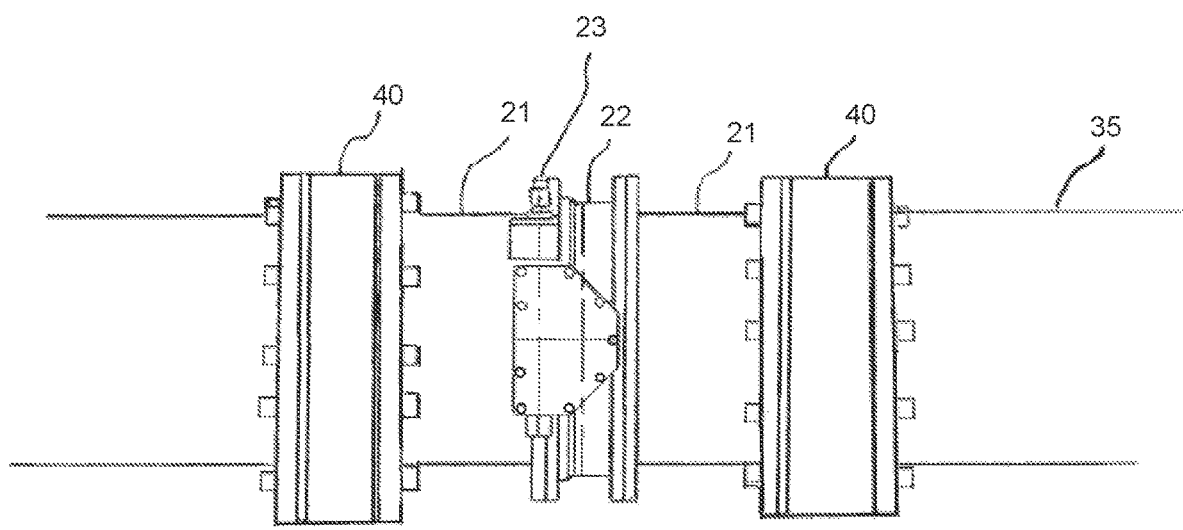

FIG. 16 is a side elevation view that presents the completely inserted valve with permanent fittings attached over the cut gap. The typical fitting is known in the industry as a standard "coupling". The coupling covers and permanently seals the gap that is temporarily internally plugged by the cut-covering assembly, thereby completing the method of inserting a valve into a live pipeline. These couplings can be installed loose on the new valve's pipe ends during insertion so split style couplings will not have to be used.

Figure 17:
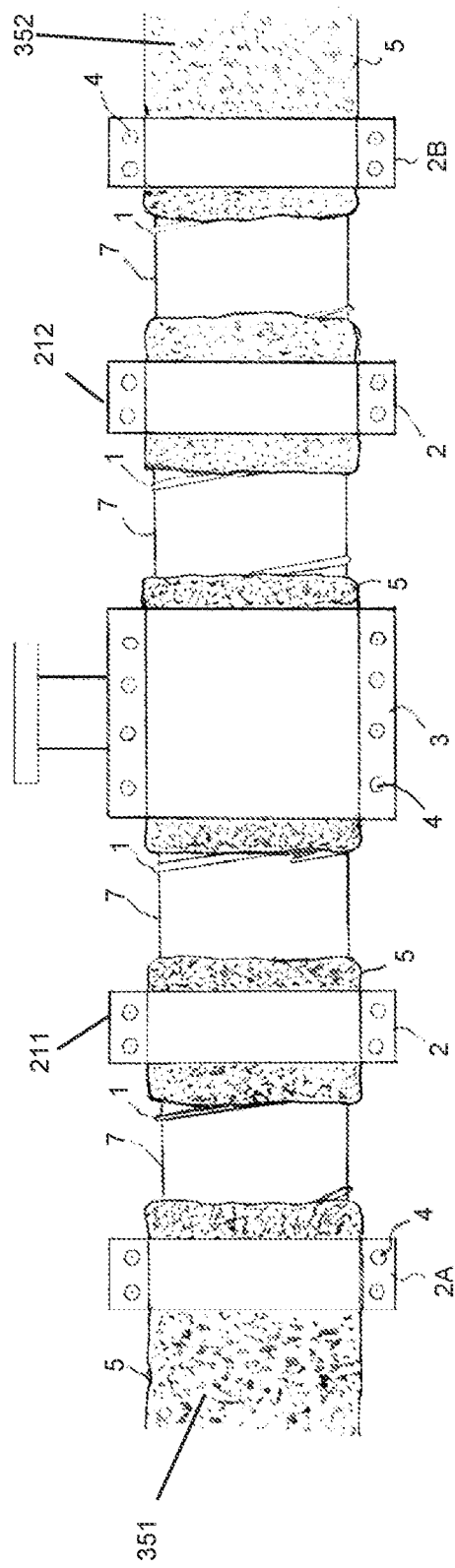

FIG. 17 is a side elevation view that shows how multiple clamps can be used to expose more than two work areas of clear smooth pipe cylinder for work that may be required on PCCP pipe.

Figure 18:
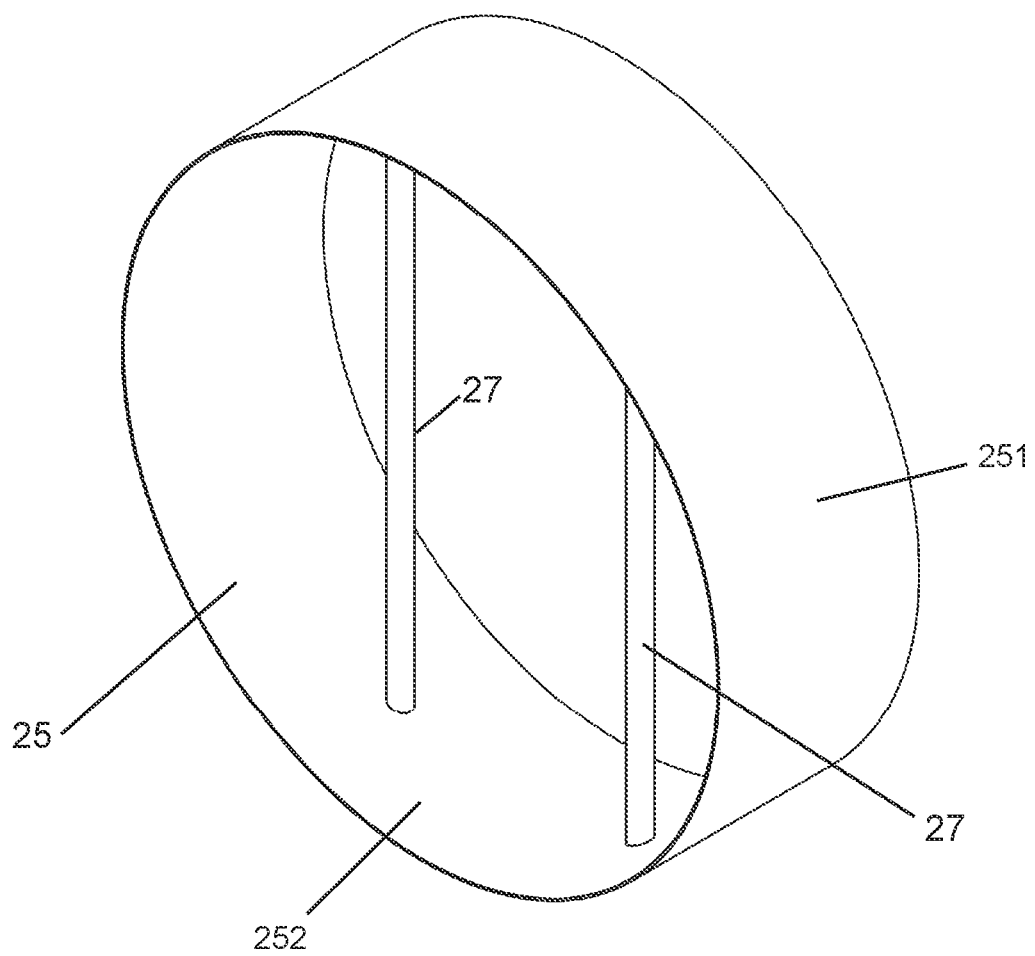

FIG. 18 is a perspective view of the spring tube and cross braces of an embodiment of a cut-covering assembly.

Figure 19:
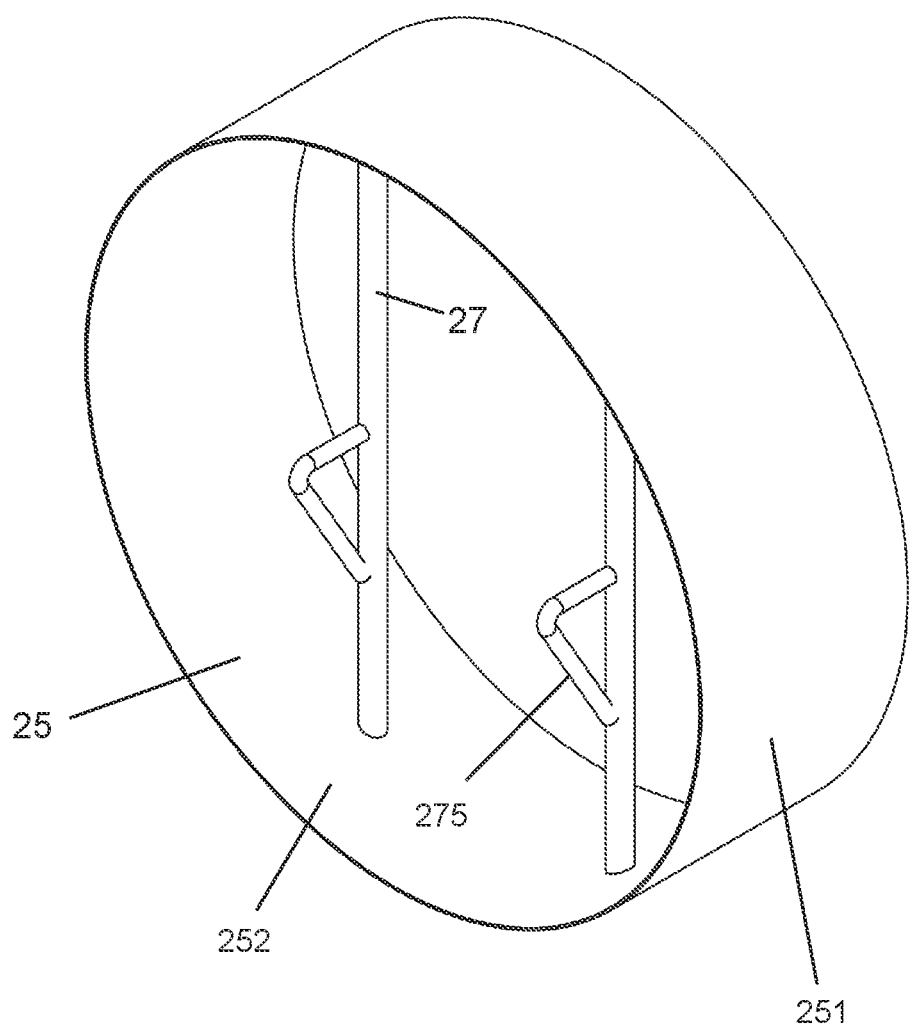

FIG. 19 is a perspective view of the spring tube and cross braces of another embodiment of a cut-covering assembly.

Figure 20:
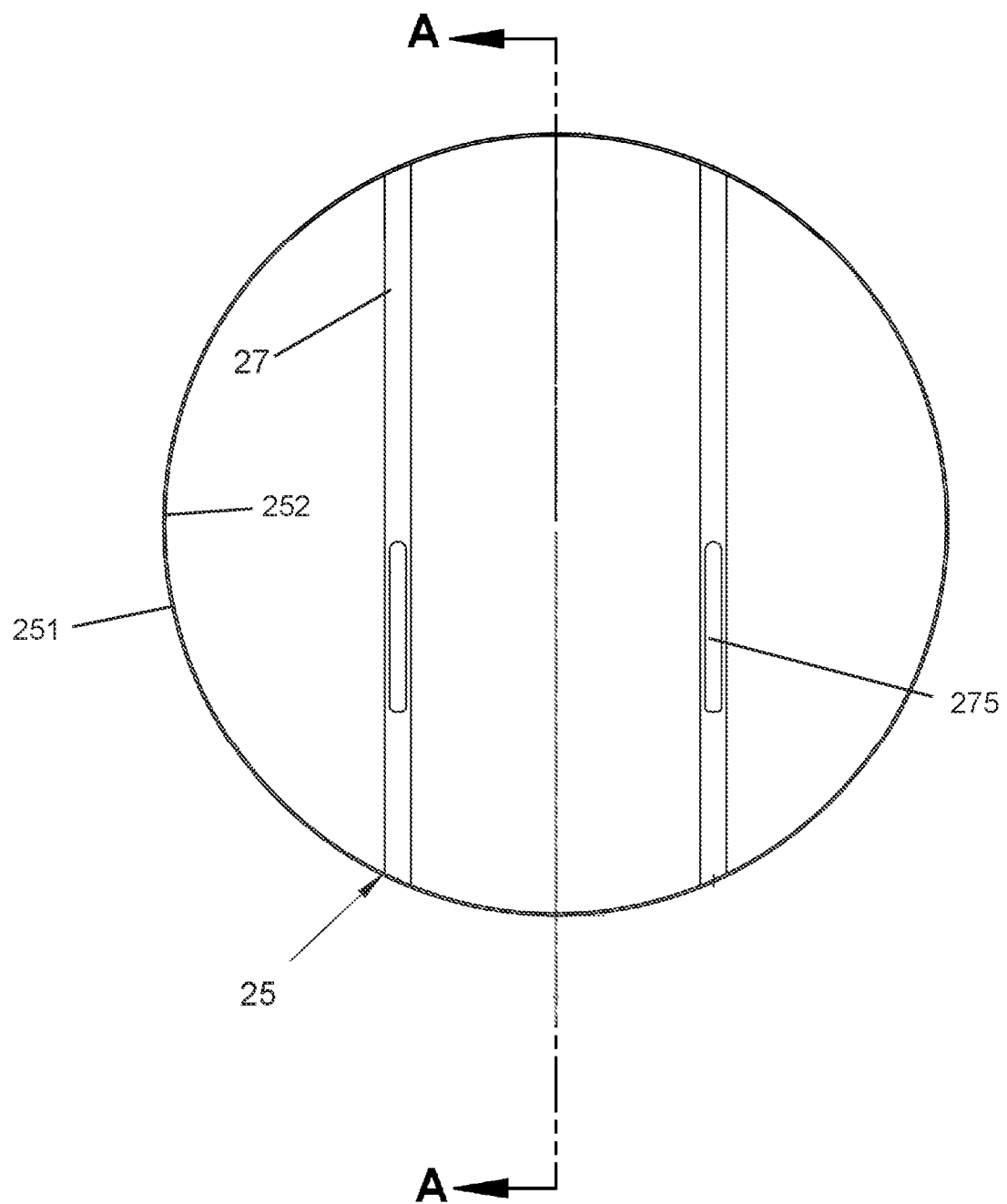

FIG. 20 is a front elevation view of the spring tube and cross braces of the embodiment of a cut-covering assembly of FIG. 19.

Figure 21:
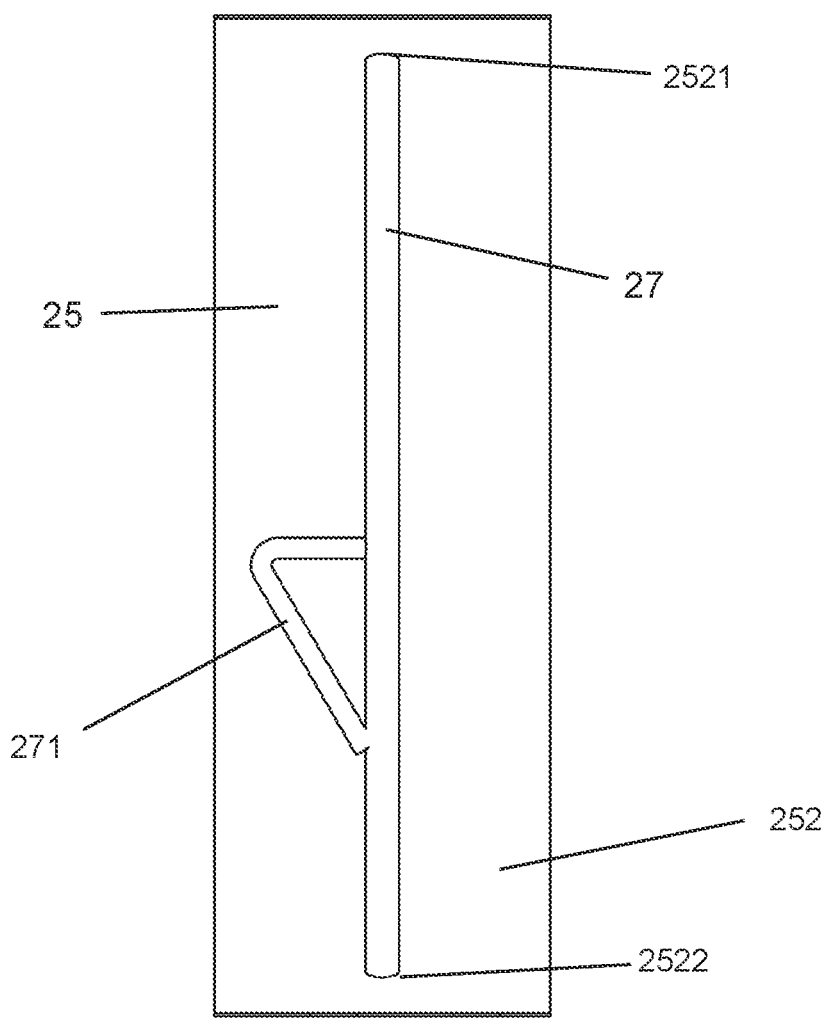

FIG. 21 is a side sectional view of the spring tube and cross braces of the embodiment of a cut-covering assembly of FIG. 19 along line A-A of FIG. 20.

Figure 22:
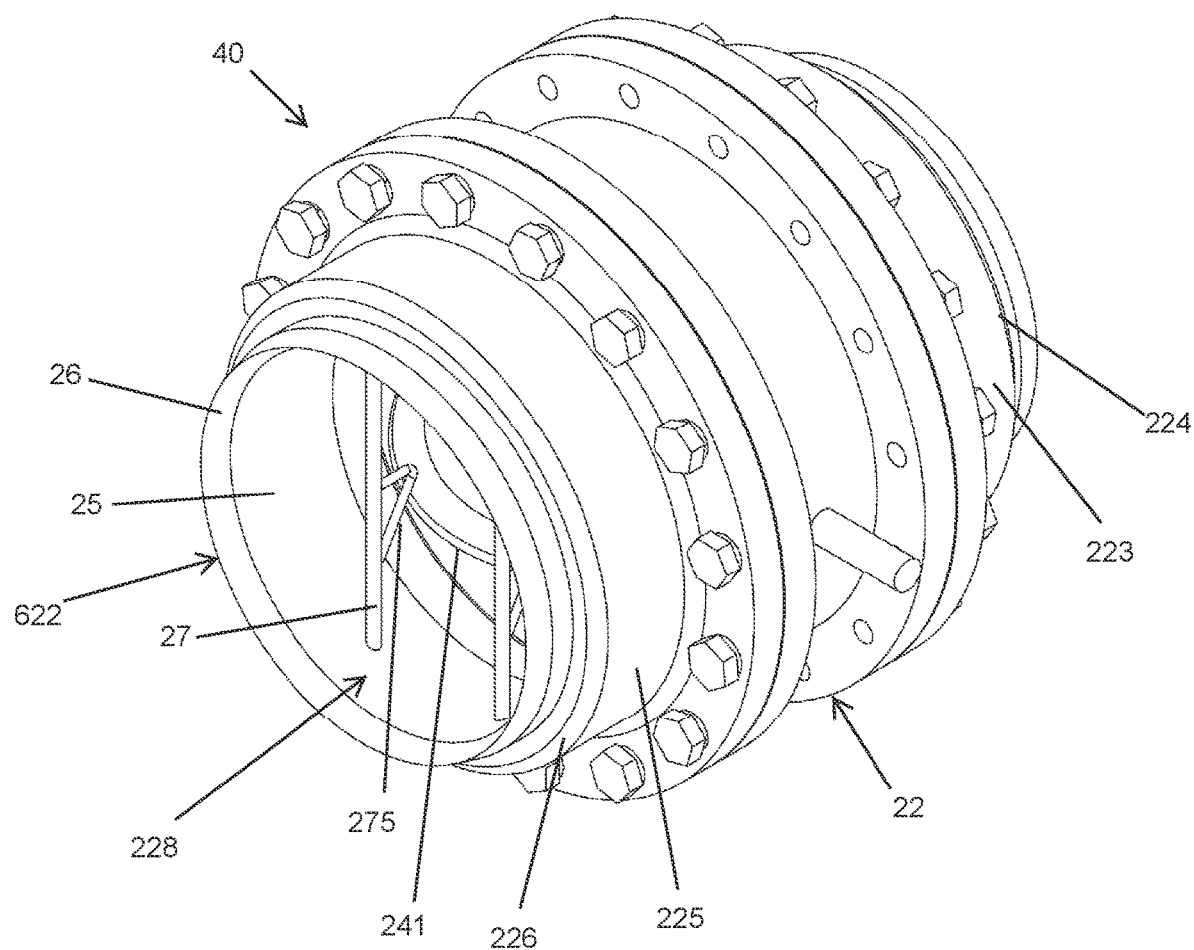

FIG. 22 is a perspective view of an embodiment of a replacement valve assembly.

Figure 23:
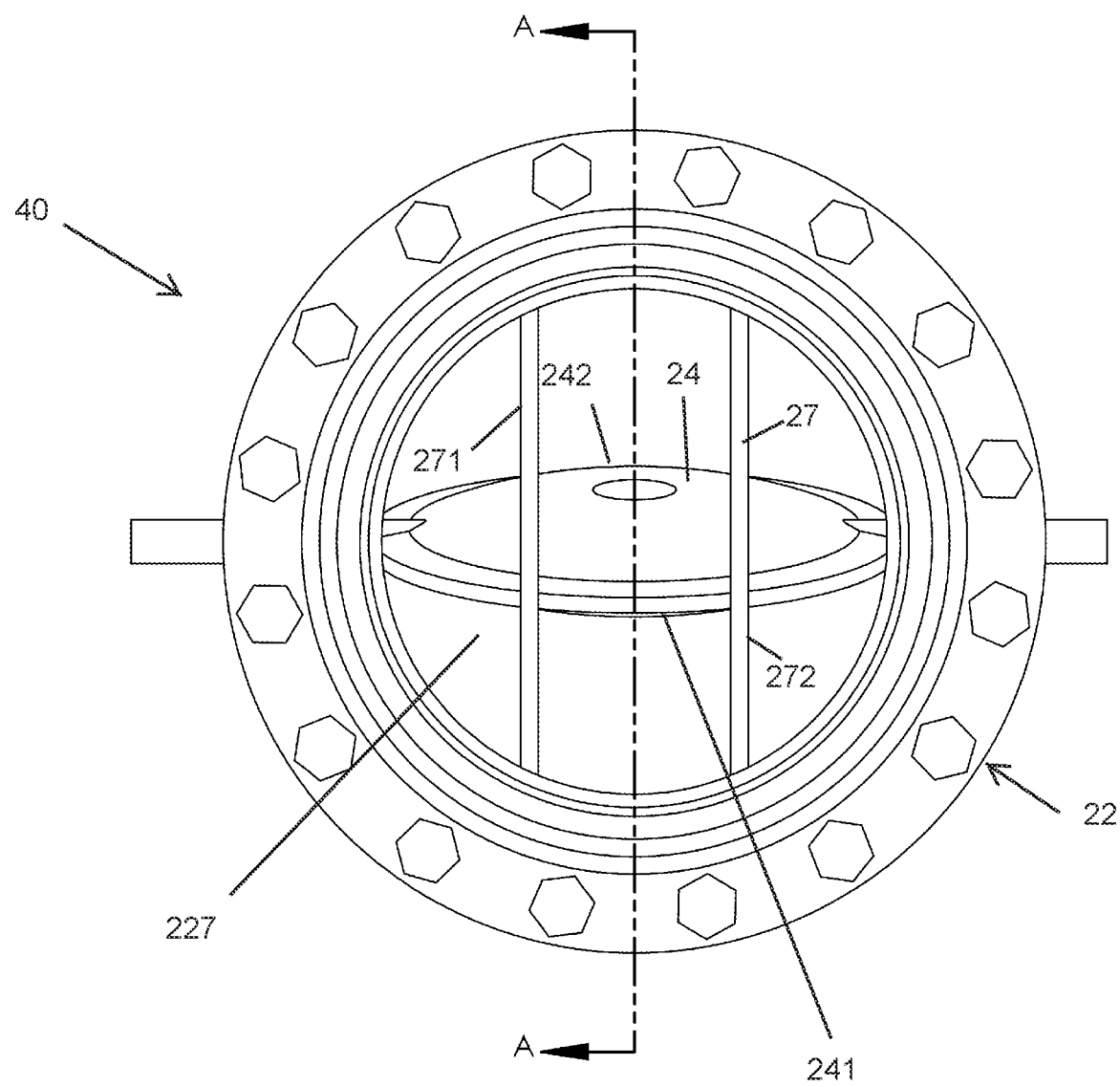

FIG. 23 is a front elevation view of the replacement valve assembly of FIG. 22.

Figure 24:
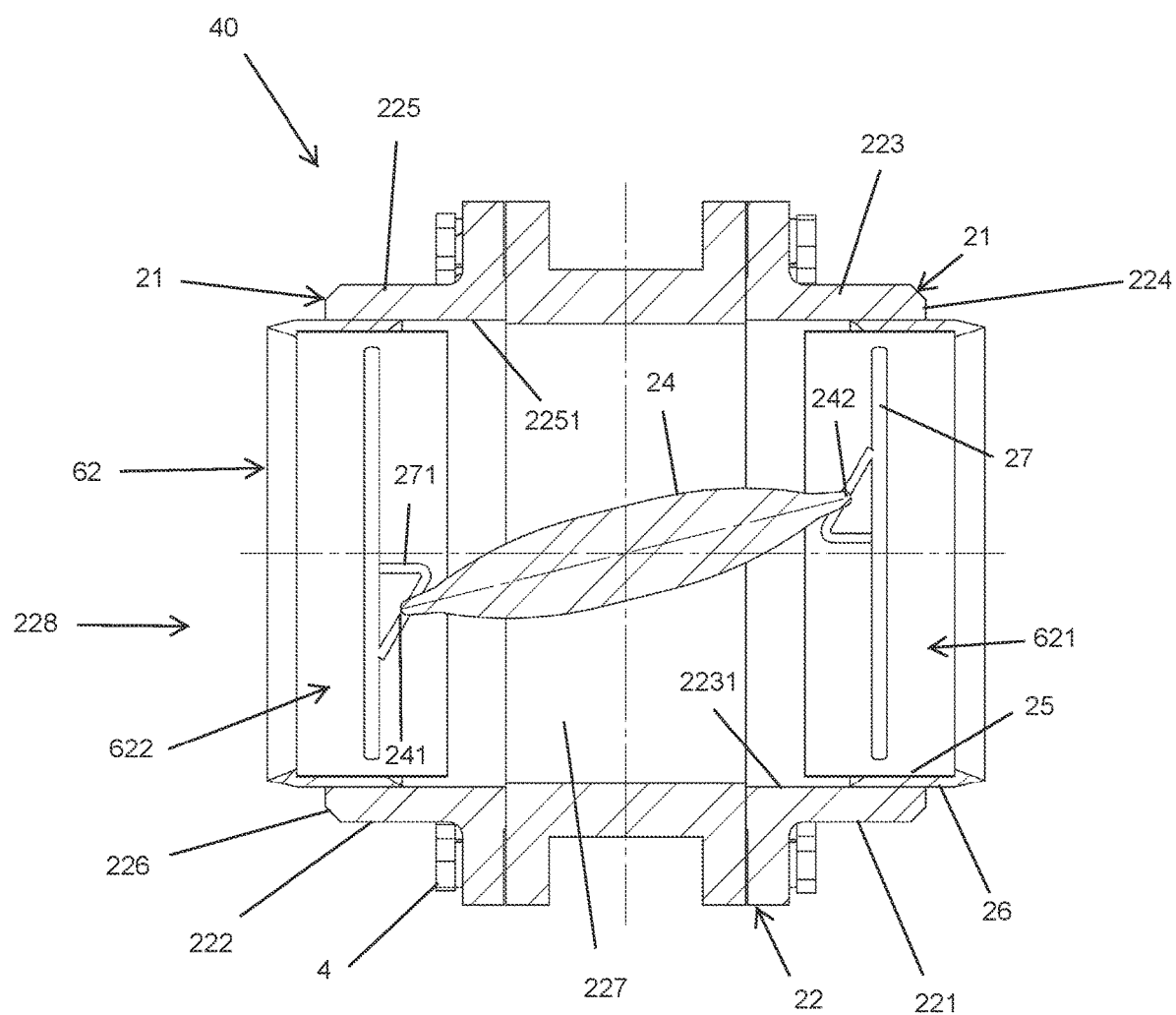

FIG. 24 is a side sectional view of the of the replacement valve assembly of FIG. 22 along line A-A of FIG. 23.

Figure 25:
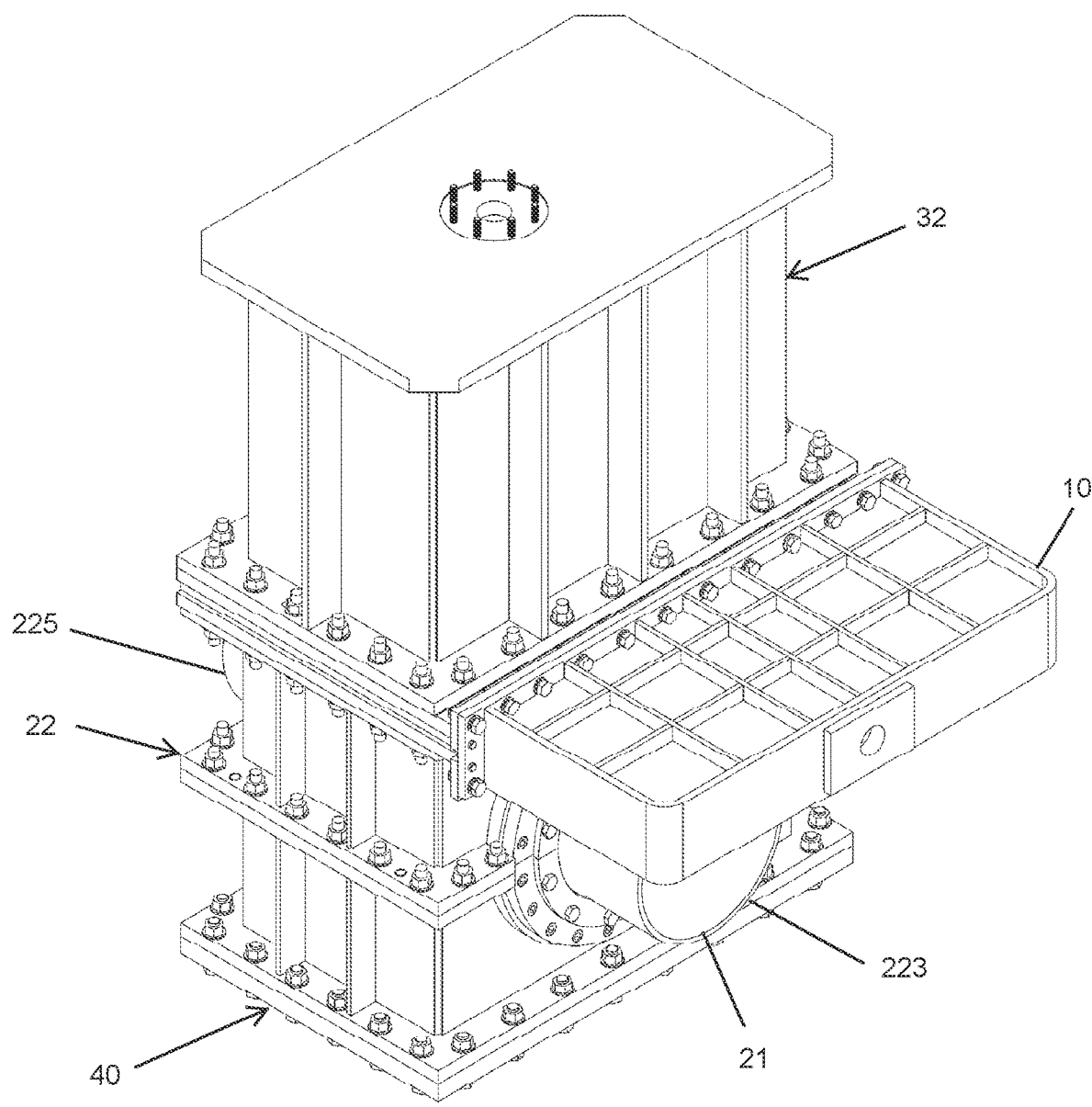

FIG. 25 is a perspective view of the replacement valve assembly of FIG. 22 attached to a service valve and bonnet.

Figure 26:
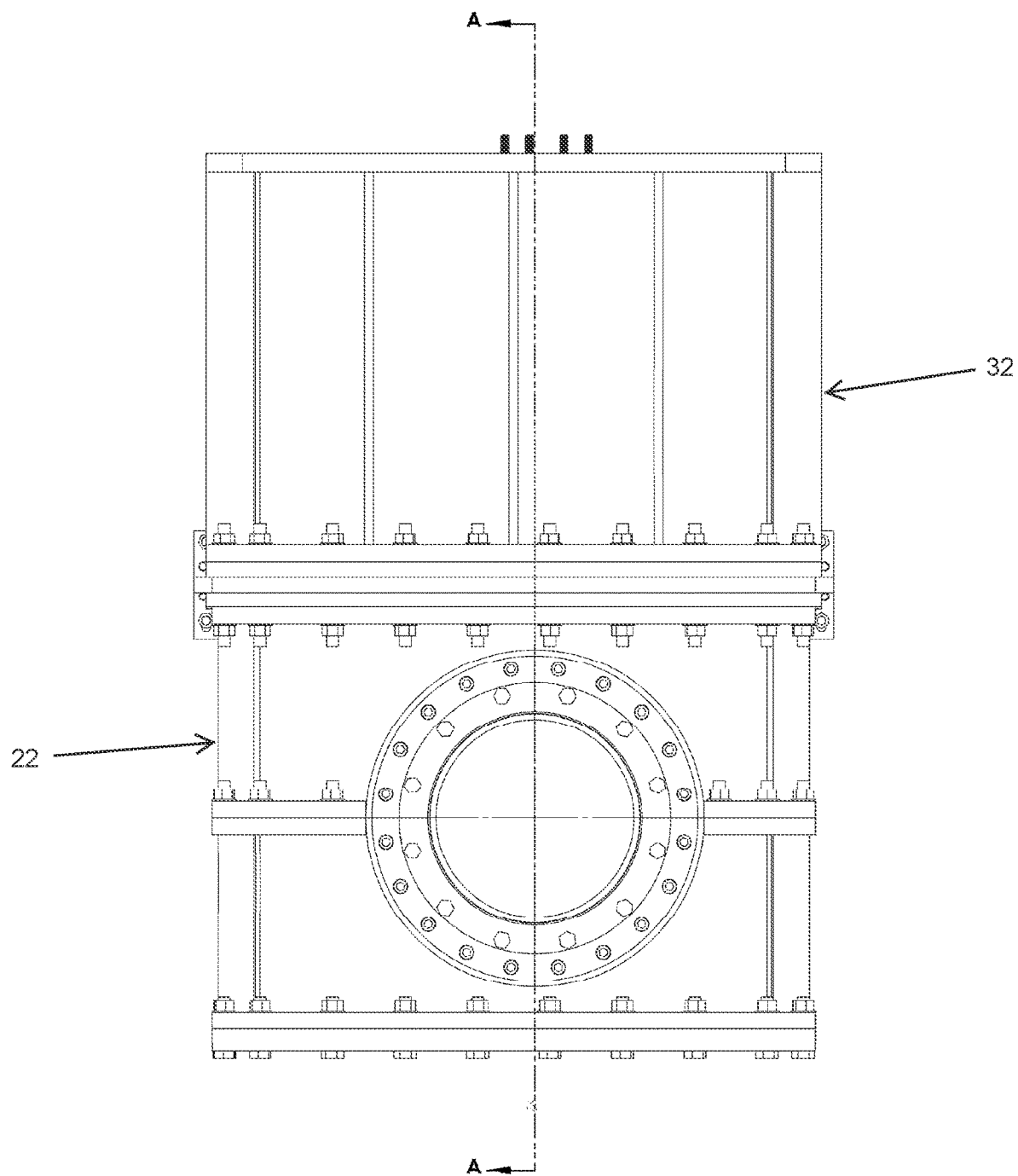

FIG. 26 is a front elevation view of the replacement valve assembly, service valve and bonnet of FIG. 25.

Figure 27:
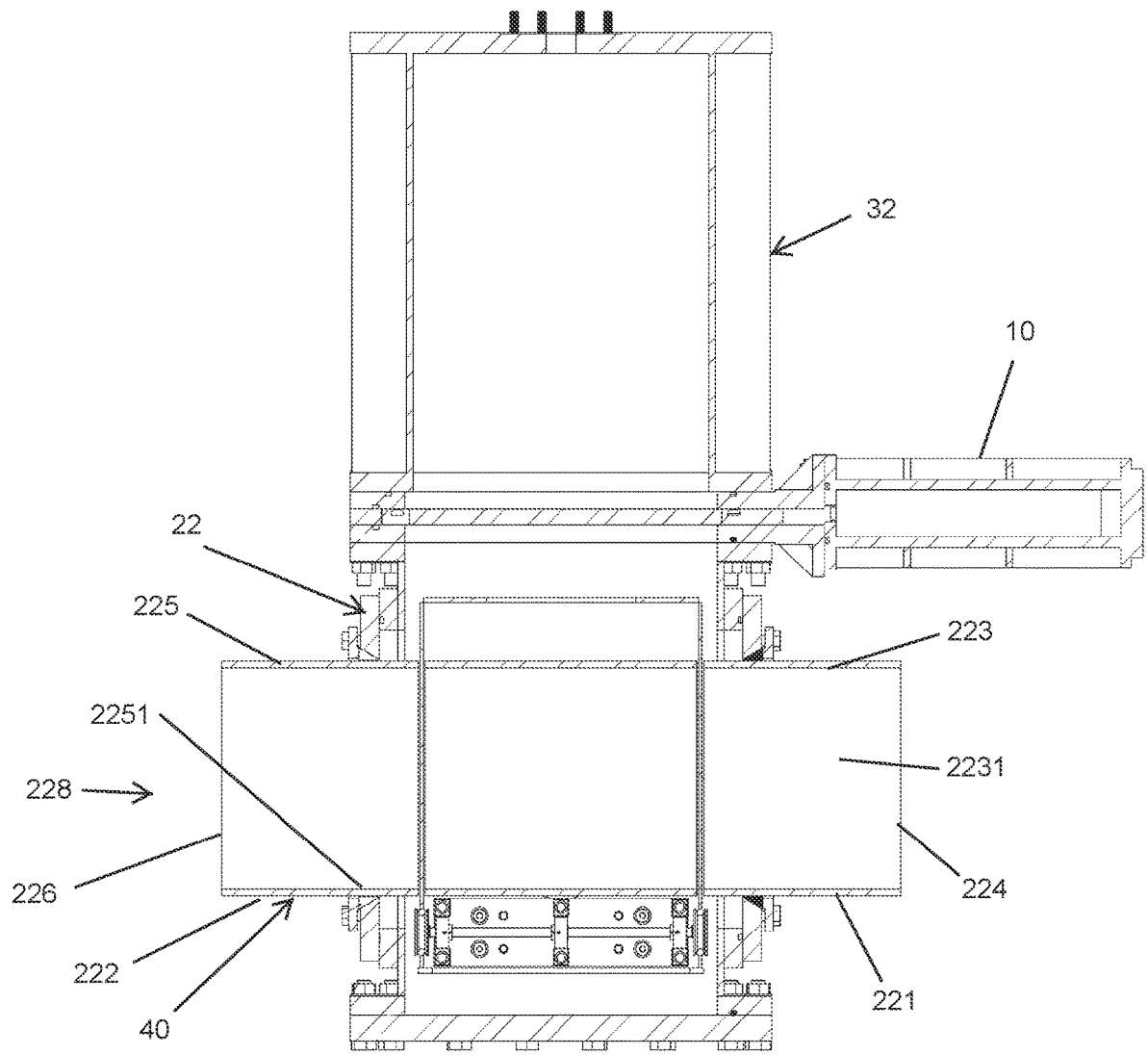

FIG. 27 is a side sectional view of the replacement valve assembly, service valve and bonnet of FIG. 25 along line A-A of FIG. 26.

The reference numbers in the figures refer to the following:

| Component | Reference Number |
|---|---|
| tension wire | 1 |
| outside restraining clamp | 2 |
| left side restraining clamp | 211 |
| right side restraining clamp | 212 |
| second left side restraining clamp | 2A |
| second right side restraining clamp | 2B |
| center restraining clamp | 3 |
| bolts (with nuts) | 4 |
| concrete coating | 5 |
| mounting flange | 6 |
| cylinder | 7 |
| pressurized enclosure / housing | 9 |
| service valve | 10 |
| mechanical gland | 11 |
| wheels | 12 |
| abrasive belts | 13 |
| stabilizing member | 15 |
| jack screws | 17 |
| internal bracket of the housing | 19 |
| pipe section | 20 |
| new pipe end assemblies | 21 |
| new valve body | 22 |
| valve body right side | 221 |
| valve body left side | 222 |
| valve body right side cylinder | 223 |
| right side cylinder interior | 2231 |
| right side cylinder opening | 224 |
| valve body left side cylinder | 225 |
| left side cylinder interior | 2251 |
| left side cylinder opening | 226 |
| central chamber | 227 |
| fluid passage | 228 |
| operating nut | 23 |
| disc (isolator) / valve | 24 |
| first medial edge | 241 |
| second medial edge | 242 |
| seal | 26 |
| seal exterior | 261 |
| seal interior | 262 |
| internal spring tube | 25 |
| spring tube exterior | 251 |
| spring tube interior | 252 |
| cross brace | 27 |
| first cross brace | 271 |
| second cross brace | 272 |
| cross brace medial flange | 275 |
| cutting tool | 30 |
| bonnet | 32 |
| pipe (pipeline) | 35 |
| left side of the pipe | 351 |
| right side of the pipe | 352 |
| left medial portion of the pipe | 353 |
| right medial portion of the pipe | 354 |
| pipe ends | 36 |
| replacement valve assembly | 40 |
| gearbox | 50 |
| shaft | 51 |
| drive unit | 52 |
| cut-covering assembly | 62 |
| right side cut-covering assembly | 621 |
| left side cut-covering assembly | 622 |
| rod | 72 |
| cut gap | 77 |
| receiving cavity | 87 |
| wedged rubber | 88 |

DETAILED DESCRIPTION

Figure 1:
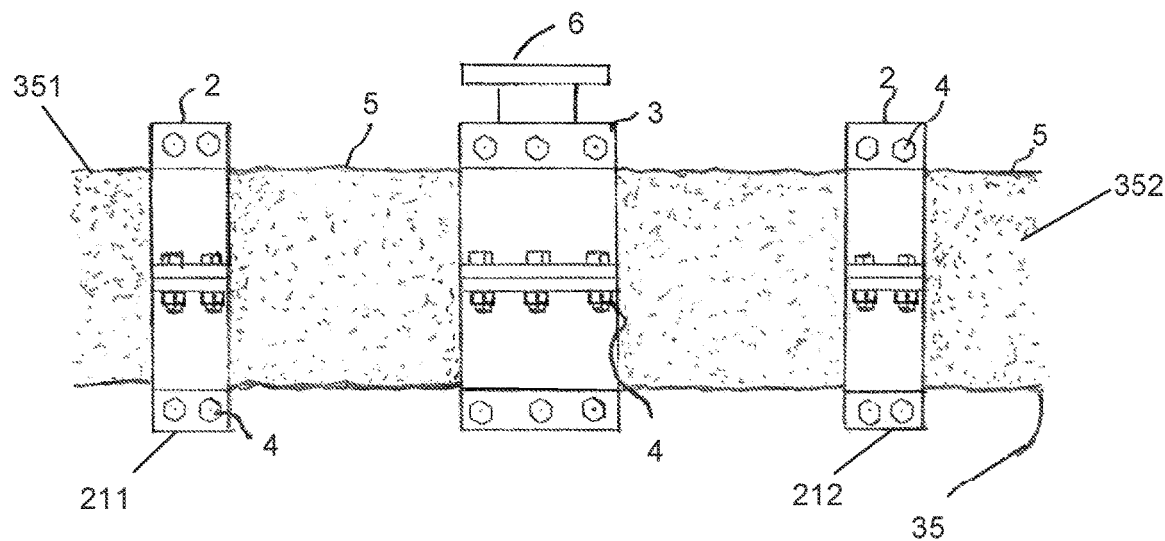
FIG. 1 is a side elevation view of existing pipeline with three restraining clamps attached, a first outside-restraining clamp, a center restraining clamp with a mounting plate and a second outside-restraining clamp. Once the clamps are installed around the pipeline's concrete exterior, the clamps retain the concrete coating that holds the tensioned wires in place. Only PCCP pipe requires restraining of tension wires to provide a smooth clear cylinder.
Figure 2:
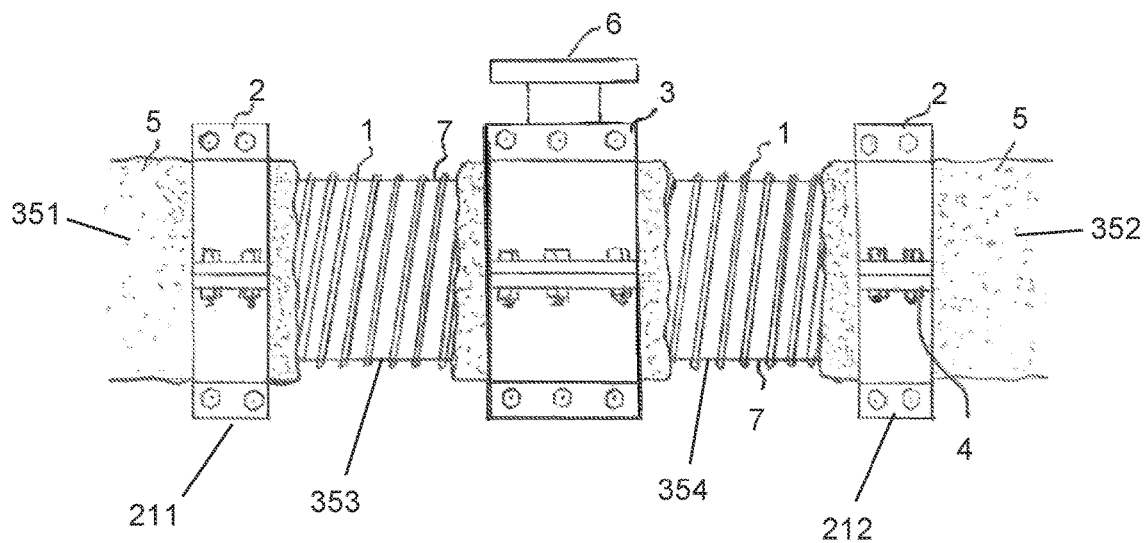
FIG. 2 is a side elevation view that shows existing a PCCP pipeline with three restraining clamps in place. These clamps secure the tension wires by encircling the concrete coating under compression. The concrete coating is removed between the center restraining clamp and outside restraining clamps, exposing the tension wires.
Figure 3:
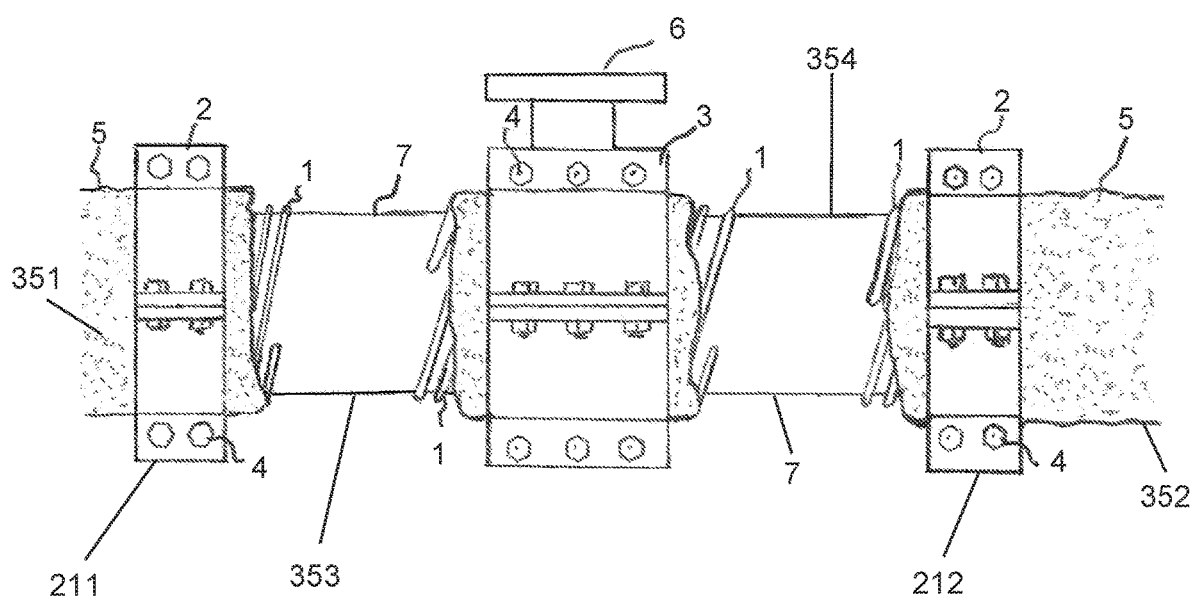
FIG. 3 is a side elevation view of a PCCP pipeline with three restraining clamps installed. The tension wires between the clamps are safely removed, exposing the smooth steel cylinder to provide safe areas where work can be performed. The tension wires are removed between the center restraining clamp and the outside restraining clamps, exposing smooth steel cylinder in two locations where work can be performed.

As seen in FIGS. 1-3, tension wires 1 are embedded within the concrete coating 5 of a pipeline made with PCCP pipe. Restraining clamps 2 remain permanently a part of the pipeline 35 to the keep the wire 1 in tension around cylinder 7 to secure the strength of pipeline 35. Center restraining clamp 3 is temporary and is installed a short distance away from outside clamps 2 to provide smooth areas of cylinder 7 free of wire 1 and concrete 5 without risking the loss of pipe 35 strength. Clamps can be formed from a combination of pieces joined for example by bolts 4, as shown in the illustrated embodiments. Restraining clamps 2 and 3 are designed to hold the various sizes of pipelines 35 and accommodate internal working pressures. A mortar mix can be applied to make up for out-of-round surfaces of concrete 5.

The center restraining clamp 3 can be made up of a combination of pieces to make one clamp or a combination of clamps with multiple pieces as seen in FIG. 1 to make up the center restraining clamp 3. The center clamp 3 is provided with a mounting flange 6 that mates with stabilizing member 15. The stabilizing member 15 preferably attaches to mounting flange 6 by common threading or bolting. Threading is preferred because it is a stabilizing member that allows attachment and detachment (screwing and unscrewing) under pressure. The center restraining clamp 3 is installed around pipeline 35 encircling its concrete coating 5 to secure the tension wires 1 that support cylinder 7.

Clamps 2, 3 are preferably assembled by bolting 4, and the outside clamps 2 are installed a predetermined distance and outside of center-clamp 3. The outside-restraining clamps 2 can consist of a single clamp or a combination of clamps to make up the outside-restraining clamp 2. Bolts and nuts 4 are used to assemble restraining clamps 2,3. These outside restraining clamps 2 can remain as a permanent part of the pipeline 35.

Multiple outside restraining clamps can be used and left in place to provide additional service locations along the steel cylinder 7 for tooling or services. For example, as seen in FIG. 17 a second left side restraining clamp 2A placed to the left of the left side restraining clamp 211 and a second right side restraining clamp 2B placed to the right of the right side restraining clamp 212 can be attached to the pipe 35.

The center restraining clamp 3 seen in FIGS. 1-4 has a smaller width, like that of the new valve 22 with its sub-assemblies 21. The center restraining clamp 3 is removed from its position with pipe section 20 as seen in FIG. 9. When the section 20 is cut by the cutting tool 30 (see FIGS. 5, 7) this removing section 20 includes removal of the center restraining clamp 3 as shown in FIG. 9 while the pipeline 35 is fully pressurized. Enclosure 9 allows equal pressure inside and outside of pipeline 35 so this removal of cut section 20 can be performed. The removal of the center restraining clamp 3 with cut section 20 could not take place without an equal pressure condition of pipeline 35. Once the wire 1 is cut to expose the smooth cylinder 7 and clamp 3 is removed, the wire 1 would separate from cylinder 7 and the unsupported cylinder 7 would run the risk of rupturing after wire 1 is removed.

Using the present method, by encapsulating the center restraining clamp 3 with enclosure 9 to provide exterior pressurization of pipeline 35 with the same pressure as the inside of pipeline 35, no stress exists from internal pressure on cylinder 7. This allows cutting and removing center restraining clamp 3 with the pipe section 20 from pipeline 35 to be safely performed. In addition, equal pressure produced by enclosure 9 allows the cut-covering assemblies 62 to be inserted smoothly with very little resistance and without fluid pressure escaping through gap 77. Unequal pressure would affect the movement of the cut-covering assemblies 62 into the pipe ends 36.

Figure 4:
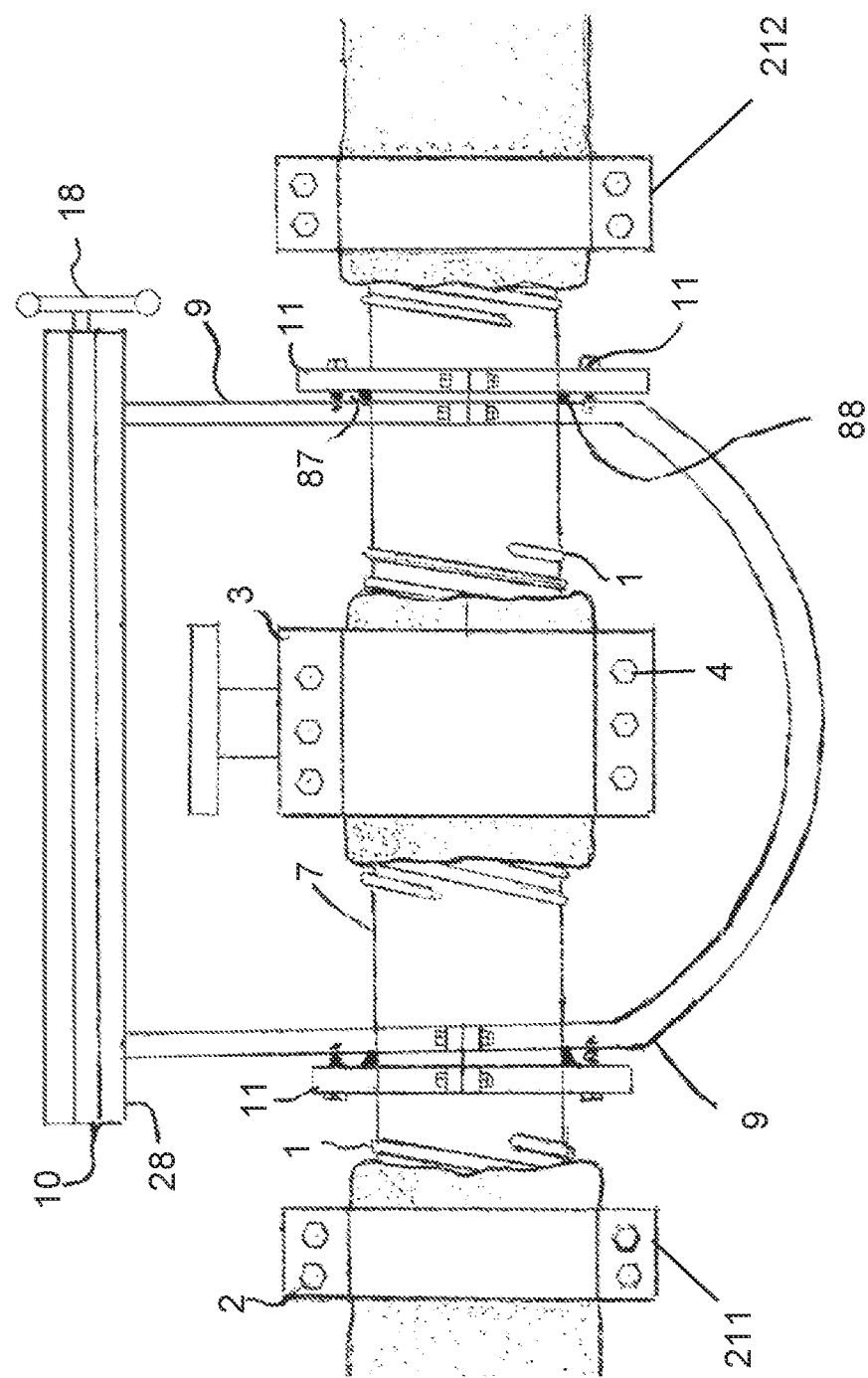
FIG. 4 is a sectional side elevation view of a PCCP pipeline with three restraining clamps installed around the concrete coating to secure the tension wires, allowing areas of the steel cylinder to be exposed. The center clamp has a mounting attachment for the stabilizing member to connect. A pressure holding enclosure is mechanically installed on the existing pipeline. Using an enclosure with more than one part allows installation of this enclosure in fluid-tight arrangement onto a pressurized pipeline. The enclosure provides the means of attaching a service valve on top. This service valve allows various operations that are required to perform the insertion valve process.

The pressurized enclosure 9 shown in FIG. 4 connects onto the pipeline 35 using mechanical seal or gland 11 that by bolting pushes and compresses a wedged rubber (elastomeric) gasket 88 into a receiving cavity 87 on enclosure 9. The gasket 88 surrounds the pipe and is preferably cut at a tapered angle to form a wedge and wrapped around the pipe in cavity 87 so that when the ring member 11 is tightened it seals the cut rubber edges by compression all the way around the pipe to form a mechanical joint. This multi-piece enclosure 9 is installed on a clear area of a cylinder 7 or on a smooth pipe 35.

Enclosure 9 has a mounting surface 28 where a service valve 10 connects so that a bonnet 32 can be installed and removed to perform various services. Attached to bonnet 32 is a stabilizing member 15 that can be retracted and advanced to restrain clamp 3 by mounting flange 6. Clamp 3 is attached to pipe section 20 to retain the pipe section in position for cutting.

Figure 5:
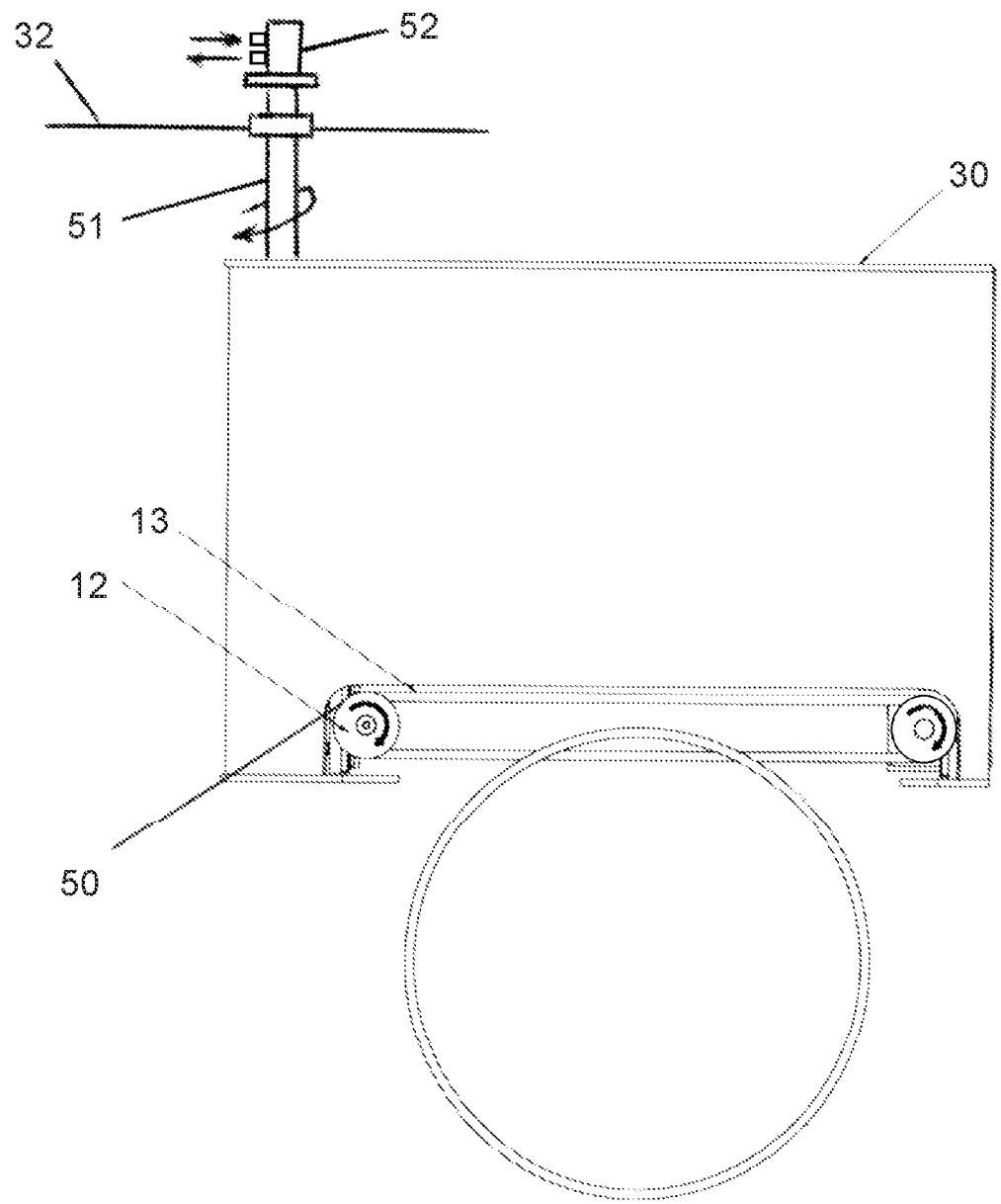
FIG. 5 is a side elevation view that shows the cutting mechanism that uses at least one drive wheel and one support wheel to move a flexible belt. The belt incorporates attached diamonds, carbides or other abrasive media to wear through pipelines such as PCCP that are concrete, or the belt can include cutting edges that are sharp to perform cutting for pipes such as plastic and iron. In one embodiment the belt can include edges similar to a chain saw. In a preferred method the mechanism has at least two cutting belts with at least two drive wheels to sever the pipe section with one movement. Some pipelines may require one cut to be performed at a time. This figure shows a gearbox that is driven by a shaft which extends outside of the bonnet so that a power unit can be used to turn the belts.
Figure 6:
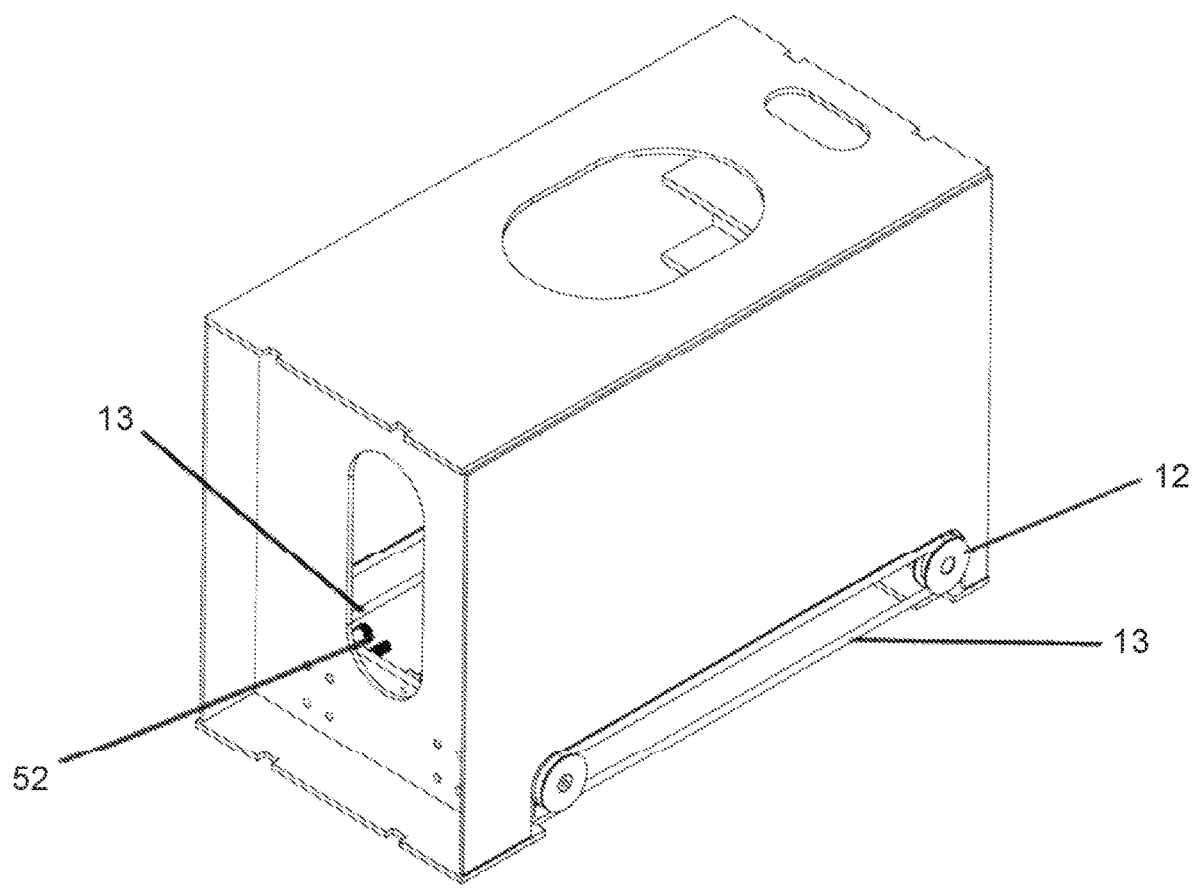
FIG. 6 is a perspective view depicting a gear box that turns drive wheels that power the movement of the belt to cut the pipe. The belt is impregnated with diamonds or other cutting medium. A number of existing products using flexible cables and wire that cuts material can be used. This illustration shows how the cutting assembly can be arranged and used to turn two flexible belts. The belts are used to make perpendicular cuts through the pipe section so a section of pipe can be cut and removed from a pipeline after a section of pipe is severed.

Abrasive belts 13 which rotate on the cutting tool 30 can be used, as shown in FIG. 5 and FIG. 6. At least one gearbox 50 can be provided that can be powered by a shaft 51 that passes through the housing 9 or bonnet 32 to connect to a drive unit 52 so the belts 13 can move to cut the pipeline 35.

Using an external drive 52 can allow a hydraulic or electric drive 52 without being under water or pressurized within the housing 9. The provided wheels 12 keep the belt 13 tight and drive the belt to perform cutting of a section of pipe 20 from pipeline 35. Advancing the jack screws 17 on FIG. 7 moves the cutter 30 to advance the cut and retract afterward, i.e., to move the cutter 30 up and down in the housing 9 or bonnet 32. Cut section 20 being attached to clamp 3 allows both to be retracted along with cutting tool 30 by member 15 into the housing 32. Once retracted, the service valve 10 can be closed to isolate pressure found in existing pipeline 35.

As seen in FIG. 9, the housing 32 can be removed from service valve 10. The cutting tool 30 along with the removed pipe section 20 and the center clamp 3 are removed from the housing. As seen in FIG. 10, a new valve 22 with pipe ends 21 can then be attached. Cut-covering assemblies 62 are placed within each pipe end 21 and the valve 22 is secured to stabilizing member 15 and retracted into housing 32 so the housing 32 can be bolted to service valve 10. Once housing 32 is secured to service valve it can be fully opened to pressurize housing 32 allowing the new valve with end assemblies 21 to be installed where pipe section 20 was removed from the existing pipeline 35, creating existing pipe ends 36 as seen in FIG. 10.

As seen in FIG. 11, new valve 22 with attached pipe ends 21 containing cut-covering assemblies 62 are set into alignment by stabilizing member and internal bracket 19 of the enclosure 9. The lower brackets 19 found in the housing 9 are designed to cradle the new valve 22 in true placement and the stabilizing member 15 is set tight to hold valve 22 in place and enable the bores of attached pipe ends 21 and the existing pipe ends 36 to match. The inside diameters of pipes 21 and existing pipe 36 are placed in alignment and in the same plane with one another. This allows the cut-covering assembly 62 to easily slide through all bores of the pipe ends without restriction.

Set within each new valve pipe ends 21 is the cut-covering assembly 62 as seen in FIGS. 12-15. This cut-covering assembly is set within both pipe ends 21 and arranged to clear existing pipe ends 36 while being set into the gap created by removal of cut section 20 as seen in FIG. 12. After the new valve assembly 22 and sub assemblies 21 are in position, the new valve 22 can be operated within the pressurized enclosure 9 by rotating control rod 72 as seen in FIG. 15.

Operating this control rod 72 turns operating nut 23 of the valve 22 to rotate a disc 24 or "isolator". As seen in FIG. 15, the isolator disc 24 being opened in pivoting fashion moves the disc 24 out of the valve body 22. This continued pivoting of disc 24 causes direct contact with cross brace 27 of the cut-covering assembly 62, and forces cut-covering assemblies 62 to be pushed away on each side from valve 22 and its secured placement within pipe 21 into pipe ends 36. Cut-covering assembly 62 continues to move into existing pipe ends 36 by direct contact with the isolator 24 until they slide to their predetermined position. At that point the new valve 22 and isolator 24 are in the fully open position. The cut-covering assembly 62 will stay in position due to tension created on seal 26 by the internal spring tube 25 installed as part of the cut-covering assembly 62 and will not obstruct the closing of the valve.

Cut-covering assembly 62 is installed partially into the existing pipeline 36 to a point which is at least enough to cover cut gap 77 (as seen in FIGS. 8, 12, 14, and 15) in fluid-tight engagement. The cut-covering assembly 62 as seen in FIGS. 12, 13, and 14 includes a spring tube inner structure 25 to keep the seal 26 tight against the pipe walls of 21 and 35 inside the pipe diameters. Once cut-covering assembly 62 has traveled into position to cover gap 77, the pressure within the enclosure 9 can be released, causing the seal of cut-covering assembly 62 to seat tightly with the inner walls of pipe 35 and pipe assemblies 21.

Once the temporary enclosure 9 is depressurized, it can be removed from the pipeline 35 and permanent external closure couplings 40 (seen in FIG. 16) are installed to cover gap 77 to complete the valve insertion.

One embodiment of a replacement valve assembly 40 for use in the present method can be seen in FIGS. 22-24. The replacement valve assembly 40 includes a valve body 22 having a right side 221 and a left side 222. The right side 221 of the valve body 22 has a right side cylinder 223 for engaging a right side end of the cut pipe 35, while the left side 222 has a left side cylinder 225 for engaging a left side end of the cut pipe 35. In between the right side cylinder and left side cylinder of the replacement valve assembly 40 is a central chamber 227. The central chamber 227, right side cylinder 223, and left side cylinder 225 are disposed along a longitudinal axis and are in fluid communication so as to form a fluid passage 228 between a right side cylindrical opening 224 of the right side cylinder 223 and a left side cylindrical opening 226 of the left side cylinder 225. The central chamber 227 further includes a rotatable valve 24, which can be a butterfly valve, and can be in the shape of a disc.

Each of the cylinders of the replacement valve assembly 40 includes a cut-covering assembly 62, components of which can be seen in FIGS. 18-21. A right side cut-covering assembly 621 is positioned in an interior 2231 of the right side cylinder 223 and a left side cut-covering assembly 622 is positioned in an interior 2251 of the left side cylinder 225. Each cut-covering assembly includes an elastomeric seal 26, a spring tube 25, and a first cross brace 27. The exterior surface 261 of the elastomeric seal 26 contacts an interior surface of the cylinder of the replacement valve assembly 40, and an exterior surface 251 of the spring tube 25 contacts an interior surface 262 of the elastomeric seal 26. The spring tube exerts pressure (force) outwardly, i.e. on the interior surface 262 of the elastomeric seal 26, and assists in creating a fluid tight seal with the seal 26. One or more cross braces 27 extend within the fluid passage 228 of the valve body 40 in the central portion of the cut-covering assembly 621, extending between a first position 2521 on the interior surface of the spring tube and a second position 2522 on the interior surface of the spring tube 25. The cross braces 27 engage the spring tube 25 and/or the seal 26 so that when a longitudinal force is exerted on the cross brace 27 the cut-covering assembly 62 can be moved outwardly.

In some embodiments, a cut-covering assembly 62 can include both a first cross brace 271 and a second cross brace 272. The cross braces 27 can optionally include a medial flange 275 that extends inwardly toward the central chamber 227 in order to make better contact with the rotatable valve 24. In the illustrated embodiments, the medial flange is a bent rod attached at both ends to the cross brace 27.

When the rotatable valve 24 is rotated between a first position and a second position, a first medial edge 241 of the valve contacts the cross brace(s) of the right side cylinder 223 and urges a right side end of the right side cut-covering assembly 621 out of the right side cylindrical opening 224, i.e. so that the seal 26 and spring tube 25 can be moved into the open end of cut pipe adjacent to the right side of the replacement valve assembly 40. Simultaneously, a second medial edge 242 of the valve 24 (opposite the first medial edge) contacts the cross brace of the left side cylinder 225 and urges a left side end of the left side cut-covering assembly 622 out of the left side cylindrical opening 226 and into the open end of cut pipe adjacent to the right side of the replacement valve assembly 40. In this way, the two open ends of the replacement valve assembly 40 can be placed into fluid communication and fluid-tight engagement with the cut ends of the pipe 35.

An assembly including the replacement valve assembly 40 of FIGS. 22-24, a service valve 10, and a bonnet 32 for use as described above are shown in FIGS. 25-27.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Definitions

As used herein, the following terms and variations thereof have the meanings given below, unless a different meaning is clearly intended by the context in which such term is used.

"Brace" refers to a structural component attached to a structure in order to strengthen and/or support the structure.

"Clamp" refers to a component which exerts pressure on the outer surface of a pipe in the present system. Clamps used in the present system and method exert sufficient binding force to restrain the tension wires in PCCP pipe with sufficient force to prevent the tension wires from losing tension.

"Prestressed Concrete Cylinder Pipe" (PCCP) refers to a pipe formed from a concrete core, a thin steel cylinder, high tensile prestressing wires and a mortar coating. The concrete core is the main structural load-bearing component, with the steel cylinder acting as a water barrier between the concrete layers. The prestressing wires produce a uniform compressive pressure in the core that offset tensile stresses in the pipe, and the mortar coating protects the prestressing wires from physical damage and external corrosion.

In addition, the terms "above," "below," "between," and other terms of relative position or orientation as used herein refer to a relative position of one layer with respect to other layers. As such, one layer deposited or disposed above or below another layer may be directly in contact with the other layer or may have one or more intervening layers, unless described otherwise herein.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. Ranges which are described as being "between" two values include the indicated values.

What is claimed is:

1. A replacement valve assembly 40, comprising:
a valve body having a right side and a left side, the valve body comprising a right side cylinder, a left side cylinder, and a central chamber between the right side cylinder and the left side cylinder, wherein the central chamber, the right side cylinder, and the left side cylinder are disposed along a longitudinal axis and are in fluid communication so as to form a fluid passage between a right side cylindrical opening of the right side cylinder and a left side cylindrical opening of the left side cylinder, and wherein the central chamber comprises a rotatable valve; and
a right side cut-covering assembly in an interior of the right side cylinder and a left side cut-covering assembly in an interior of the left side cylinder, wherein each cut-covering assembly comprises an elastomeric seal, a spring tube, and a first cross brace, wherein an exterior surface of the elastomeric seal contacts an interior surface of the cylinder, an interior surface of the elastomeric seal contacts an exterior surface of the spring tube, and the first cross brace extends within the fluid passage of the valve body between a first position on the interior surface of the spring tube and a second position on the interior surface of the spring tube,
wherein when the rotatable valve is rotated between a first position and a second position, a first medial edge of the valve contacts the first cross brace of the right side cylinder and urges a right side end of the right side cut-covering assembly out of the right side cylindrical opening, and simultaneously a second medial edge of the valve contacts the first cross brace of the left side cylinder and urges a left side end of the left side cut-covering assembly out of the left side cylindrical opening.

2. The replacement valve assembly of claim 1, further comprising a second cross brace in each of the cut covering assemblies.

3. The replacement valve assembly of claim 1, wherein each of the cross braces comprises a medial flange, wherein the medial flange extends inwardly toward the central chamber.

4. The replacement valve assembly of claim 3, wherein the medial flange is a bent or curved bar that joins the cross brace at both ends of the bar.

5. The replacement valve assembly of claim 1, wherein the rotatable valve is a butterfly valve.

6. A method for replacing a valve in a pipe, comprising:
placing a housing in fluid-tight engagement with the pipe on a right side and left side of the valve;
cutting the pipe on the right side and left side of the valve, thereby creating a right side opening and a left side opening in the pipe;
removing the valve through the housing;
advancing a replacement valve assembly into the housing, wherein a cut-covering assembly is disposed within each pipe end of the replacement valve assembly, each cut-covering assembly comprising a cylindrical, elastomeric seal, a spring tube within the seal and a cross brace in the interior of the spring tube, the valve assembly further comprising a rotatable valve between the cut-covering assemblies;
placing the pipe ends of the valve assembly into alignment with the right side opening and the left side opening of the pipe; and
rotating the valve between a first position and a second position, wherein a first medial edge of the valve contacts a cross brace of a right side cut-covering assembly in a right side cylinder of the valve assembly and urges a right side end of the right side cut-covering assembly out of the right side cylinder, and simultaneously a second medial edge of the valve contacts a cross brace of a left side cut-covering assembly in a left side cylinder of the valve assembly and urges a left side end of the left side cut-covering assembly out of the left side cylinder, thereby pushing the cut-covering assemblies outwardly through pipe ends and into the cut ends of the pipe and placing the valve assembly into fluid-tight engagement with the cut ends of the pipe.

7. The method of claim 6, wherein the pipe is a prestressed concrete cylinder pipe (PCCP) having a concrete outer layer, an interior metal cylinder, and wire 1 wound around the metal cylinder, further comprising the steps of: placing a left side restraining clamp onto a left side of the pipe and a right side restraining clamp onto a right side of the pipe, thereby restraining pre-stressed tension wire on a right side and a left side of the pipe;
placing a center restraining clamp on the pipe between the left side restraining clamp and the right side restraining clamp, thereby restraining pre-stressed tension wire in a center portion of the PCCP pipe, wherein the center restraining clamp comprises an upper mounting flange on an upper portion of the clamp;
removing the concrete layer and the tension wire in the left medial portion of the pipe and in the right medial portion of the pipe, thereby exposing the interior metal cylinder in the left medial portion and the right medial portion;
placing the housing around the center restraining clamp so that a left side opening of the housing surrounds the interior metal cylinder in a left medial portion of the pipe to the left of the center restraining clamp and a right side opening that surrounds the interior metal cylinder in a right medial portion of the pipe to the right of the center restraining clamp, wherein the housing is placed in fluid-tight engagement with the pipe.

8. The method of claim 6, further comprising the steps of attaching a service bonnet to an upper portion of the housing, wherein the upper portion of the housing comprises an upper opening to allow communication between the housing and the service bonnet, and wherein cutting the pipe comprises advancing a cutting tool from the bonnet through the upper opening and cutting the pipe in the left medial portion and right medial portion of the pipe, thereby separating a central portion of the pipe containing the center restraining clamp.

9. The method of claim 8, wherein a service valve is included between the housing and the service bonnet, and wherein the service valve is in communication with the upper opening of the housing.

10. The method of claim 6, wherein the left side opening of the housing and the right side opening of the housing each comprise an elastomeric material.

* * * * *